US011874192B2

(12) United States Patent
Rahav et al.

(10) Patent No.: US 11,874,192 B2
(45) Date of Patent: Jan. 16, 2024

(54) ELONGATE FORCE SENSOR ASSEMBLY WITH THROUGHGOING BORE

(71) Applicant: VISHAY ADVANCED TECHNOLOGIES LTD., Holon (IL)

(72) Inventors: Tal Rahav, Kiryat Ono (IL); Rafi Ouzan, Tel Mond (IL)

(73) Assignee: VISHAY ADVANCED TECHNOLOGIES LTD., Holon (IL)

( * ) Notice: Subject to any disclaimer, the term of this patent is extended or adjusted under 35 U.S.C. 154(b) by 121 days.

(21) Appl. No.: 17/393,801

(22) Filed: Aug. 4, 2021

(65) Prior Publication Data

US 2023/0038841 A1   Feb. 9, 2023

(51) Int. Cl.
*G01L 1/22*   (2006.01)
*G01L 5/1627*   (2020.01)

(52) U.S. Cl.
CPC ......... *G01L 5/1627* (2020.01); *G01L 1/2218* (2013.01); *G01L 1/2287* (2013.01)

(58) Field of Classification Search
None
See application file for complete search history.

(56) References Cited

U.S. PATENT DOCUMENTS

| 3,576,128 | A |   | 4/1971 | Lockery |
| 4,326,424 | A |   | 4/1982 | Koenig |
| 4,677,862 | A | * | 7/1987 | Raskin ............... G01L 1/2225 73/862.633 |
| 5,512,713 | A |   | 4/1996 | Naito et al. |

(Continued)

FOREIGN PATENT DOCUMENTS

| DE | 102007017981 | * | 12/2008 |
| DE | 102007017981 B4 |   | 12/2008 |
| EP | 1160555 A2 |   | 12/2001 |

OTHER PUBLICATIONS

An International Search Report and a Written Opinion both dated Dec. 8, 2022, which issued during the prosecution of Applicant's PCT/IL2022/050820.

(Continued)

*Primary Examiner* — Brandi N Hopkins
*Assistant Examiner* — Nigel H Plumb
(74) *Attorney, Agent, or Firm* — Sughrue Mion, PLLC

(57) ABSTRACT

An elongate force sensor assembly for measuring a force applied in a force application direction and a method of manufacturing the assembly, the force sensor assembly including an extruded elongate force responsive beam element (EFRB) extending along a longitudinal axis which is generally perpendicular to the force application direction, the EFRB having a hollow and generally rectangular cross-section generally perpendicular to the longitudinal axis and being formed with a throughgoing longitudinal bore along the longitudinal axis, the throughgoing longitudinal bore being formed together with the EFRB and a strain engine extending along a transverse axis, generally perpendicular to both the force application direction and to the longitudinal axis; at least one strain gauge affixed to the EFRB, each strain gauge generating an output in response to the force, and a plurality of circuit elements operative to convert the output into a force indication, indicating a magnitude of the force.

7 Claims, 33 Drawing Sheets

(56) References Cited

U.S. PATENT DOCUMENTS

| | | | |
|---|---|---|---|
| 2005/0160837 A1* | 7/2005 | Tellenbach | G01L 1/2287 |
| | | | 73/862.625 |
| 2010/0313679 A1* | 12/2010 | Larkin | A61B 34/71 |
| | | | 73/862.045 |
| 2014/0298923 A1 | 10/2014 | Geldman | |
| 2020/0033202 A1 | 1/2020 | Stuker | |
| 2020/0281597 A1* | 9/2020 | Eisinger | A61B 17/1155 |
| 2021/0108976 A1 | 4/2021 | Lisiak | |

OTHER PUBLICATIONS

Stano, Gianni, et al. "Additive manufacturing and characterization of a load cell with embedded strain gauges." Precision Engineering 62 (2020): 113-120.

Watschke, Hagen, et al. "Novel Resistive Sensor Design Utilizing the Geometric Freedom of Additive Manufacturing." Applied Sciences 11.1 (2021): 113.

Ibrahim, A. and Abd AlKareim Sadoon Muhsen. "Fabrication and Testing of a Strain Gage Load Cell." (2019).

George, Daniel, E. Kingston, and D. J. Smith. "Measurement of through-thickness stresses using small holes." The Journal of Strain Analysis for Engineering Design 37.2 (2002): 125-139.

"Strain Gauge Primer." Phidgets, Phidgets Inc., May 9, 2018, www.phidgets.com/docs/Strain_Gauge_Primer.

Strain Gage Based Transducers: Their Design and Construction. Measurements Group, 1988.

Micro-Measurements. Strain Gage Based Transducers. https://micromeasurements.com/, Micro-Measurements, 2010.

* cited by examiner

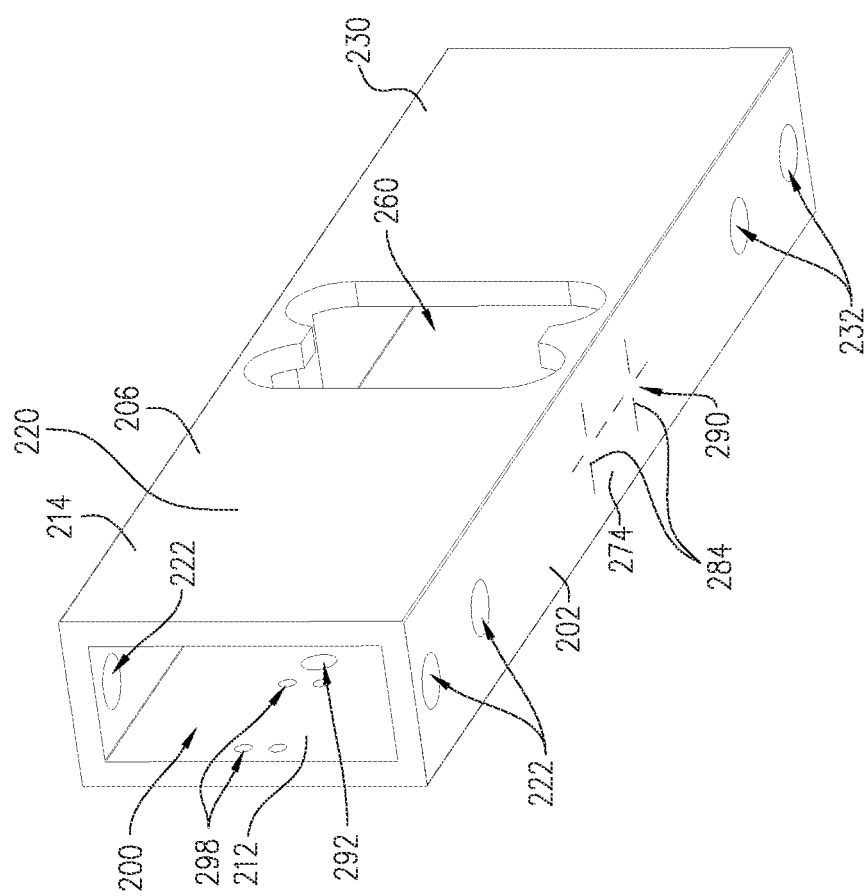

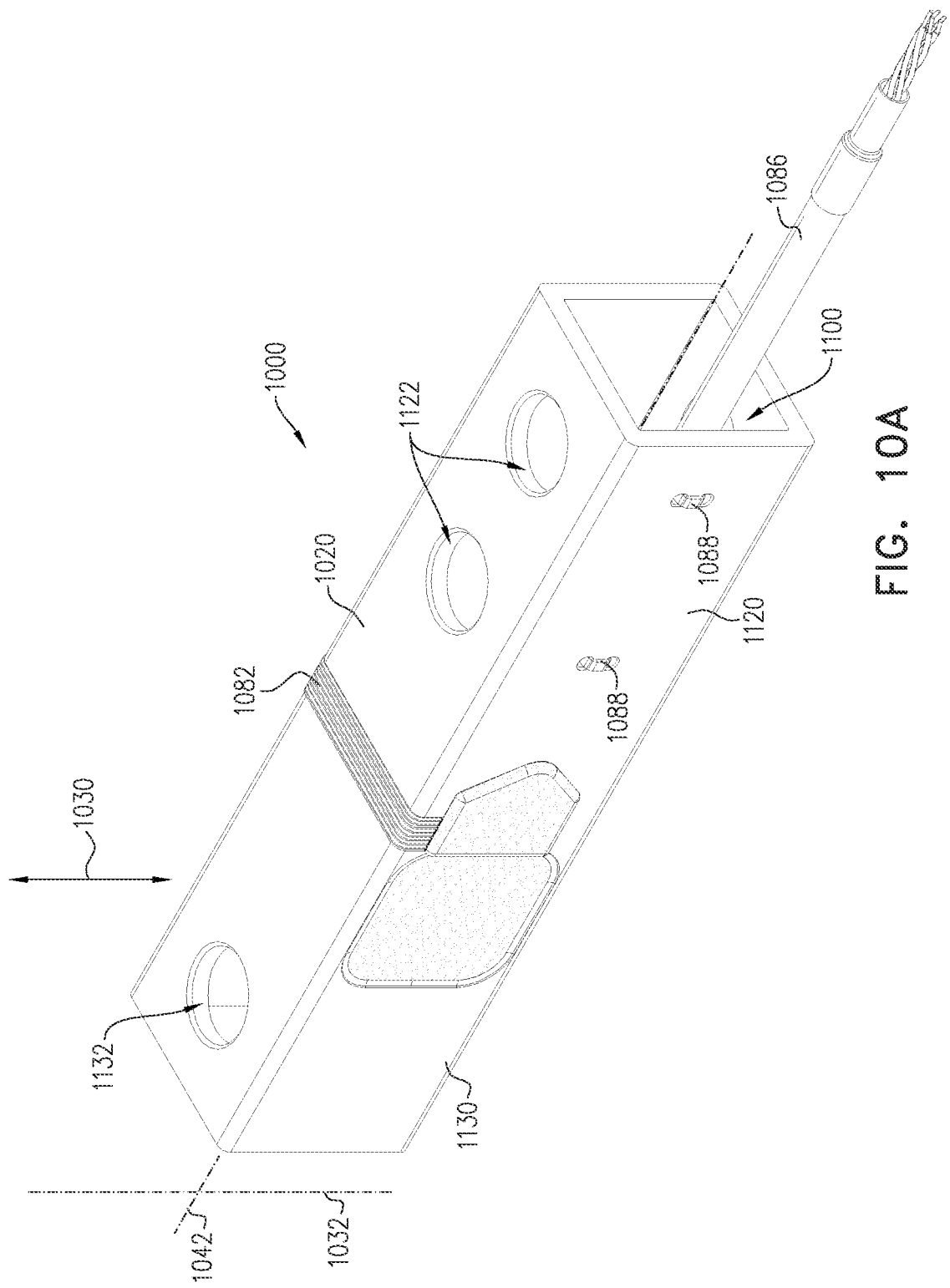

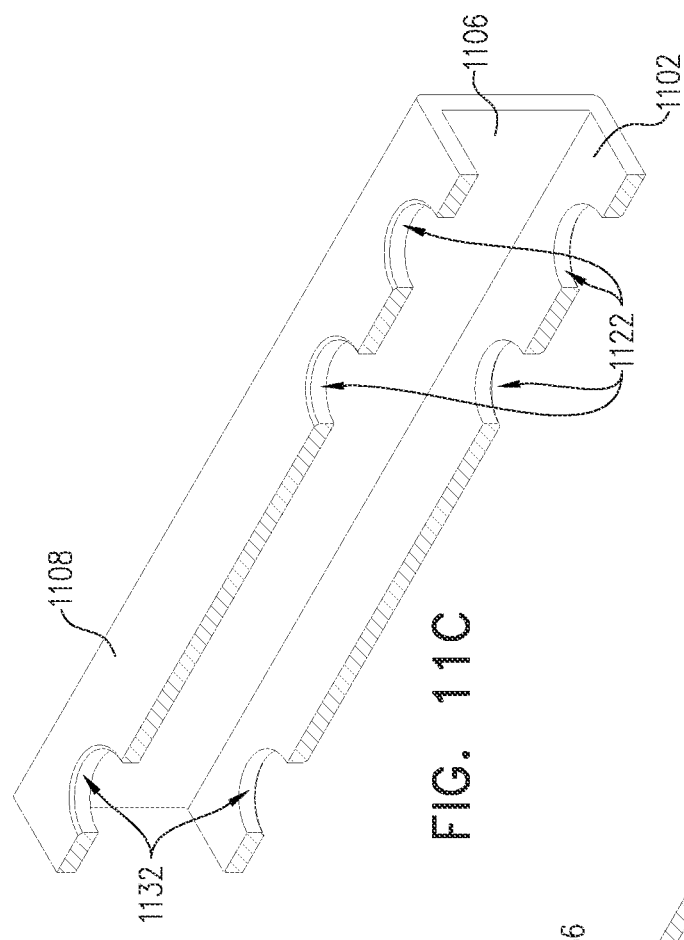
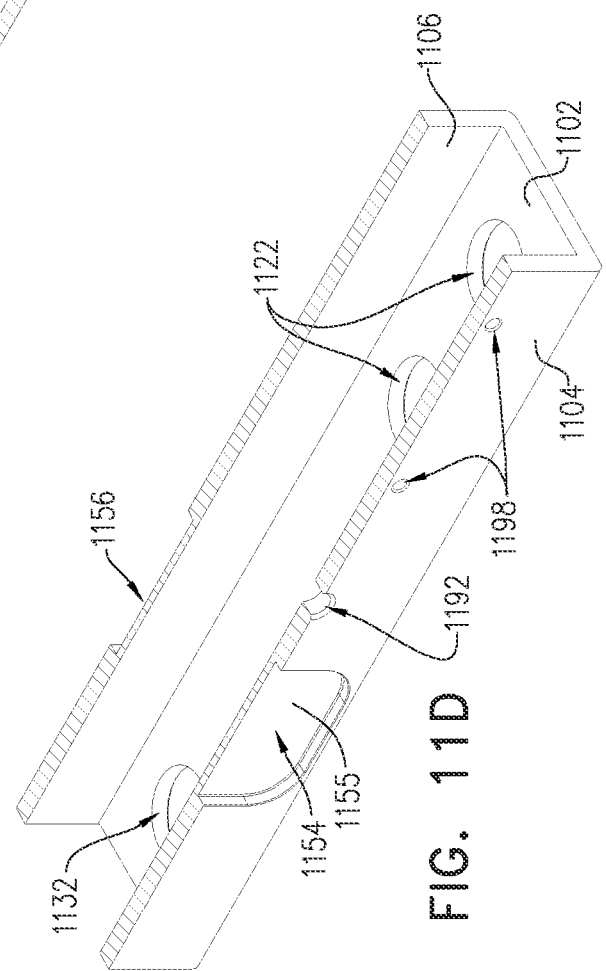

ELONGATE FORCE SENSOR ASSEMBLY WITH THROUGHGOING BORE

FIELD OF THE INVENTION

The present invention relates to beam transducers for measuring force.

BACKGROUND OF THE INVENTION

Various types of force sensors are known.

SUMMARY OF THE INVENTION

The present invention seeks to provide an elongate force sensor assembly for measuring a force applied in a force application direction, the force sensor assembly including an elongate force responsive beam element extending along a longitudinal axis which is generally perpendicular to the force application direction, the elongate force responsive beam element being formed with a throughgoing longitudinal bore along the longitudinal axis, at least one strain gauge affixed to the elongate force responsive beam element, each of the at least one strain gauge generating a strain gauge output in response to the force, and a plurality of circuit elements operative to convert the strain gauge output into a force indication, indicating a magnitude of the force.

In accordance with a preferred embodiment of the present invention, the elongate force responsive beam element is also formed with a throughgoing transverse bore extending along a transverse axis, generally perpendicular to both the force application direction and to the longitudinal axis, the at least one strain gauge and the throughgoing transverse bore at least partially overlying one another.

In accordance with a preferred embodiment of the present invention, the elongate force responsive beam element is formed by an extrusion process. Alternatively, in accordance with a preferred embodiment of the present invention, the elongate force responsive beam element is formed by a rolling process. Alternatively, in accordance with a preferred embodiment of the present invention, the elongate force responsive beam element is formed by a tube forming process.

Preferably, the throughgoing longitudinal bore houses at least one of the strain gauges. Preferably, the throughgoing longitudinal bore houses an electric cable, the electric cable being electrically connected to the plurality of circuit elements.

In accordance with a preferred embodiment of the present invention, the elongate force responsive beam element is formed with at least one recess including a generally planar wall portion, the at least one strain gauge being affixed to the generally planar wall portion.

There is also provided in accordance with another preferred embodiment of the present invention a method of manufacture of a force sensor for measuring a force applied in a force application direction, the method including fabricating an elongate force responsive beam element extending along a longitudinal axis which is generally perpendicular to the force application direction, the elongate force responsive beam element being formed with a throughgoing longitudinal bore along the longitudinal axis, affixing at least one strain gauge to the elongate force responsive beam element, each of the at least one the strain gauge being operative to generate a strain gauge output in response to the force, and electrically connecting the at least one strain gauge to a plurality of circuit elements operative to convert the strain gauge output into a force indication, indicating a magnitude of the force.

In accordance with a preferred embodiment of the present invention, the fabricating the elongate force responsive beam element includes an extrusion process. Alternatively, in accordance with a preferred embodiment of the present invention, the fabricating the elongate force responsive beam element includes a rolling process. Alternatively, in accordance with a preferred embodiment of the present invention, the fabricating the elongate force responsive beam element includes a three-dimensional printing process. Alternatively, in accordance with a preferred embodiment of the present invention, the fabricating the elongate force responsive beam element includes a metal injection molding (MIM) process. Alternatively, in accordance with a preferred embodiment of the present invention, the fabricating the elongate force responsive beam element includes a tube forming process. Alternatively, in accordance with a preferred embodiment of the present invention, the fabricating the elongate force responsive beam element includes a machining process.

BRIEF DESCRIPTION OF THE DRAWINGS

The present invention will be understood and appreciated more fully from the following detailed description, taken in conjunction with the drawings in which:

FIGS. 2A and 2B and 2C are simplified respective top-facing perspective, bottom-facing perspective and sectional illustrations of an elongate force responsive beam element of the force sensor assembly of FIGS. 1A-1D, FIG. 2C being taken along sectional line C-C in FIG. 2A;

FIGS. 10A, 10B, 10C and 10D are simplified respective assembled, top-facing partly exploded, bottom-facing partly exploded and top-facing fully exploded illustrations of an elongate force sensor assembly constructed and operative in accordance with still another embodiment of the present invention;

FIGS. 11A, 11B, 11C and 11D are simplified respective top-facing perspective, bottom-facing perspective and first sectional and second sectional illustrations of an elongate force responsive beam element of the force sensor assembly of FIGS. 10A-10D, FIGS. 11C and 11D being taken along respective sectional lines C-C and D-D in FIG. 11A;

DETAILED DESCRIPTION OF PREFERRED EMBODIMENTS

Figure 1A:
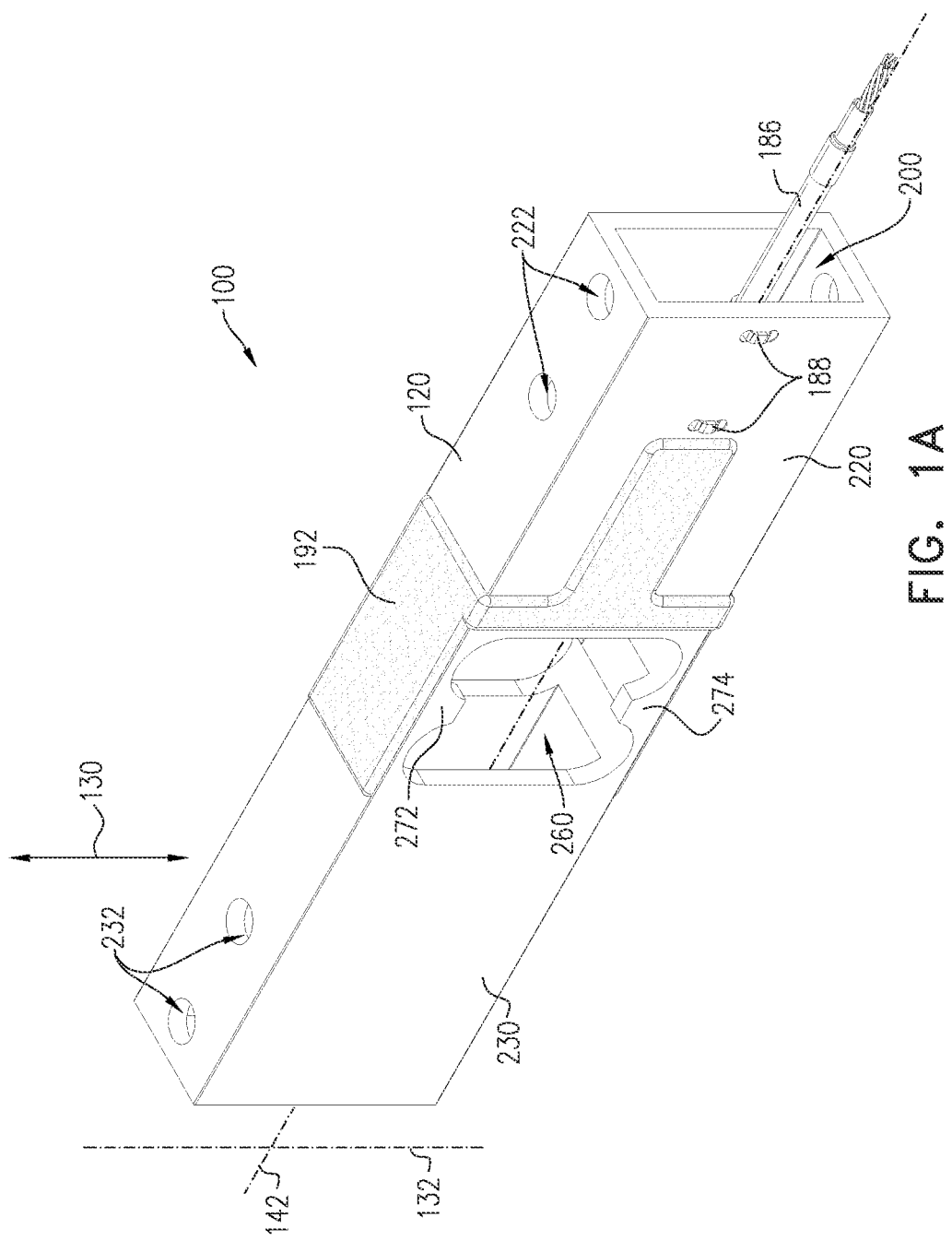
FIGS. 1A, 1B, 1C and 1D are simplified respective assembled, top-facing partly exploded, bottom-facing partly exploded and top-facing fully exploded illustrations of a bending elongate force sensor assembly constructed and operative in accordance with a first embodiment of the present invention.

Force transducers, often called load cells, are commonly used to measure applied forces, and are integral components of many types of systems, such as weighing and stability systems. One common type of force transducer is a strain gauge force transducer. Strain gauge force transducers include an elastic element, and a strain gauge force sensor is classed based on a shape and orientation of its elastic element. It is noted that elastic elements are also referred to in the art, as, inter alia, elastic bodies, spring elements and spring bodies.

For example, beam force sensors, such as bending beam force sensors, particularly single-point force sensors, include a solid beam elastic element, typically formed from a single block of material. The beam includes a mounting end, which is fixedly mounted to a support, and a loading end, which is free to deflect in a direction in which a force is to be measured. Thus, an applied force at the loading end causes the beam to deform. Typically, the beam deformation is slight, and, while measurable, is often not visible to the human eye.

As is well known in the art, the deformation, called strain, of an elongate object, such as a beam, due to an applied force is proportional to a magnitude of the applied force. Strain gauge beam force sensors measure strain using one or more strain gauges which are fixedly mounted on the beam. As is known in the art, strain gauges are electrical resistors whose resistance changes when the strain gauge is deformed. Since every strain gauge deformed configuration depends in turn on the deformation of the elastic element to which the strain gauge is mounted, for example a beam, the resistance of the strain gauge provides information about the deformation of the beam.

Typically, multiple strain gauges are used to improve reliability and strength of the output signal, though some strain gauge force sensors include only a single strain gauge. The strain gauges are arranged in an electrical configuration, some of the most common of which include full-bridge configurations, most typically Wheatstone bridge configurations, half-bridge configurations and quarter-bridge configurations.

During operation of the beam force sensor, a power source supplies an excitation voltage to the strain gauges, which in turn provide an output resistance, which results in an output voltage. By applying Ohm's law, shown in equation 1 below, to a circuit including the strain gauges, the output voltage can be related to the resistance of the strain gauges:

$$V=IR \quad \text{(Eq. 1)}$$

where V is voltage, I is current and R is resistance.

As described hereinabove, the resistance of the strain gauges is dependent on the deformation of the beam of the beam force sensor. Since the deformation of the beam depends on the applied force, additional circuit elements are typically used in conjunction with the strain gauges to convert the output voltage, which is based on the output resistance of the strain gauges, to an indication of the magnitude of the applied force. In some cases, the additional circuit elements also perform signal conditioning, improving at least one of the accuracy, precision and signal strength of the indication of the magnitude of the applied force.

Other beam force sensors, such as shear beam force sensors, also typically include a solid beam elastic element formed from a single block of material. The beam includes a mounting end, which is fixedly mounted to a support, and a loading end, which is free to deflect in a direction in which a force is to be measured. However, unlike bending beam force sensors, which measure an axial bending strain deflection caused by an applied force, shear beam force sensors measure a planar shear strain resulting from an applied force. Therefore, unlike bending beam force sensors, which typically include strain gauges placed at the top and/or bottom of the beam elastic element, where deformation of the beam is the greatest, shear beam force sensors typically include strain gauges placed near the middle of the beam elastic element, where a shear stress of the beam is the greatest.

While beam force sensors are often useful in measuring applied forces, conventional beam force sensors may be too expensive or too heavy for some applications. Therefore, the present invention seeks to provide low-cost, low-mass beam force sensors in which the solid beam is obviated and replaced with a hollow beam.

Figure 1B:
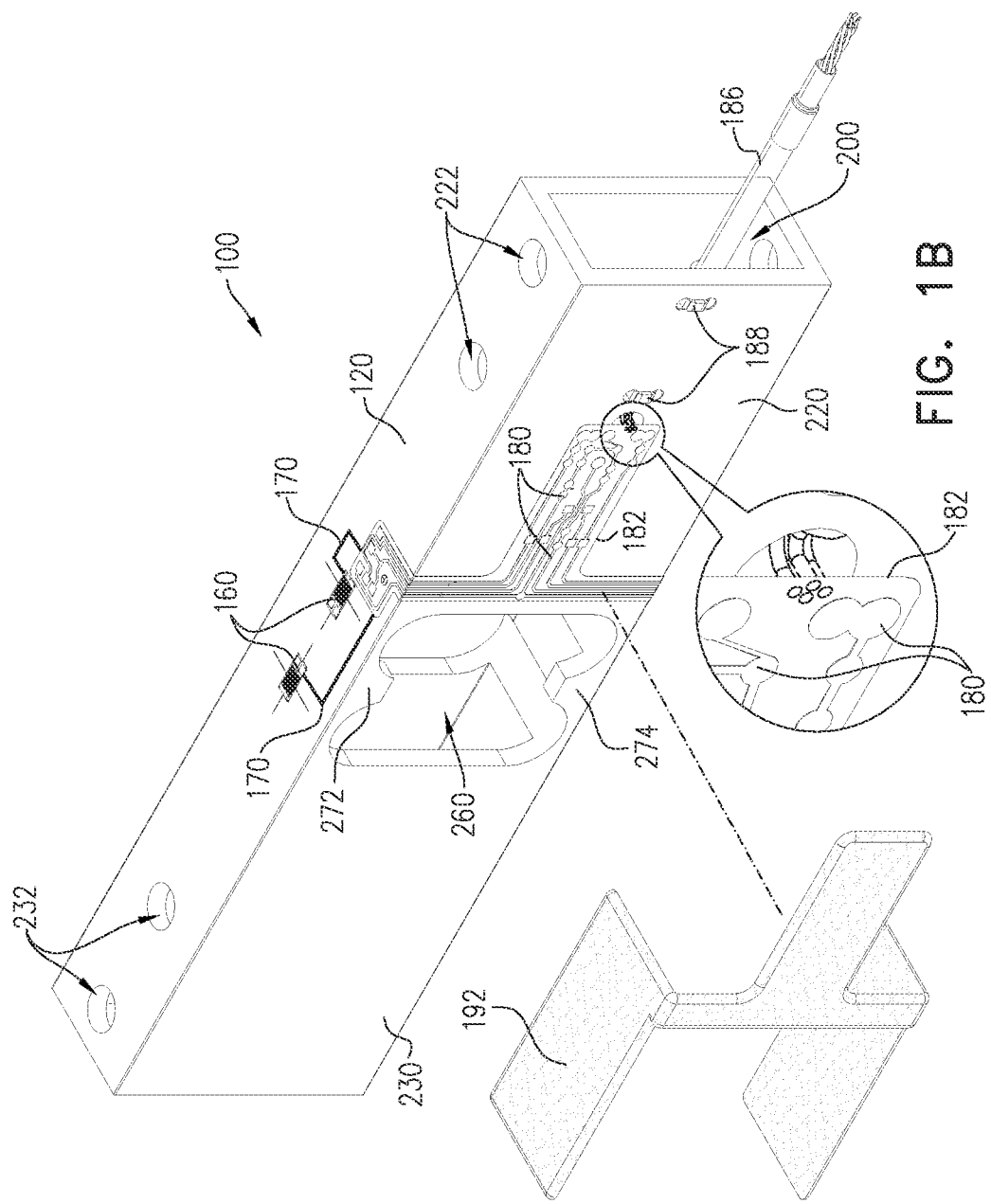
Figure 1C:
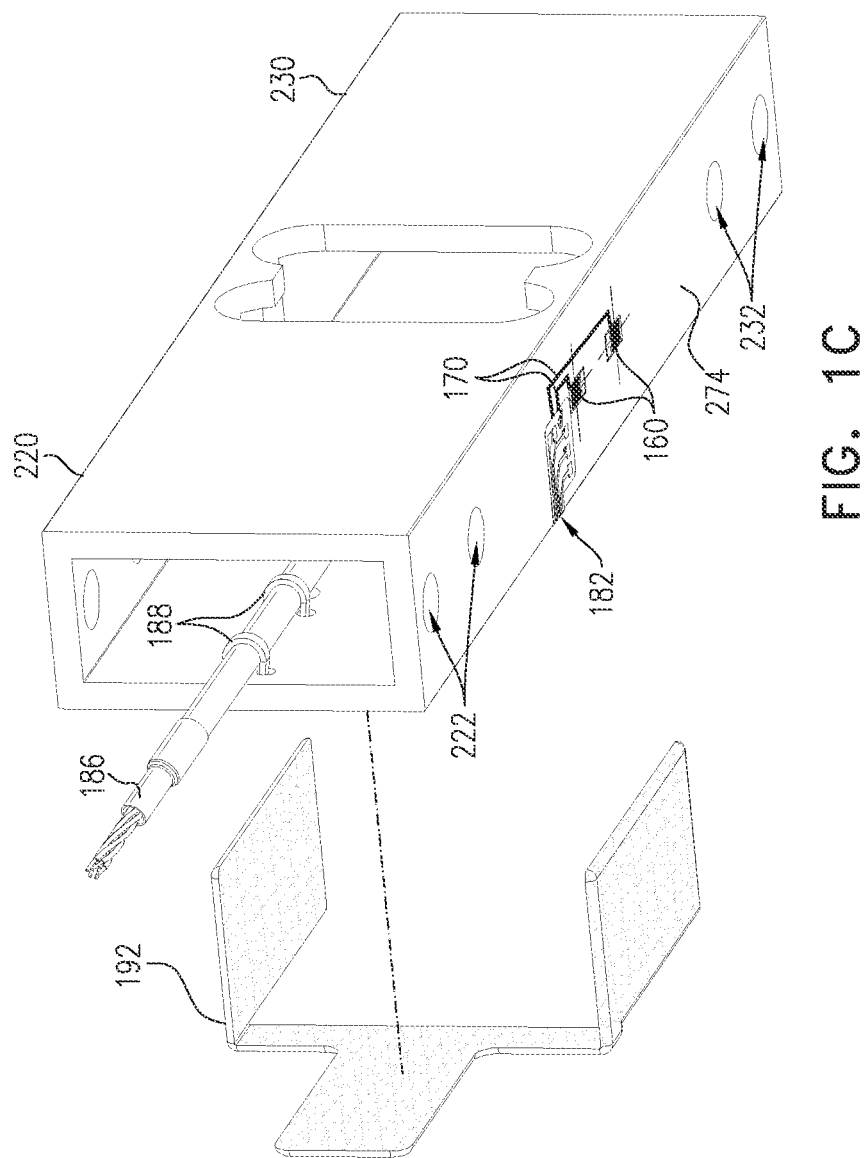
Figure 1D:
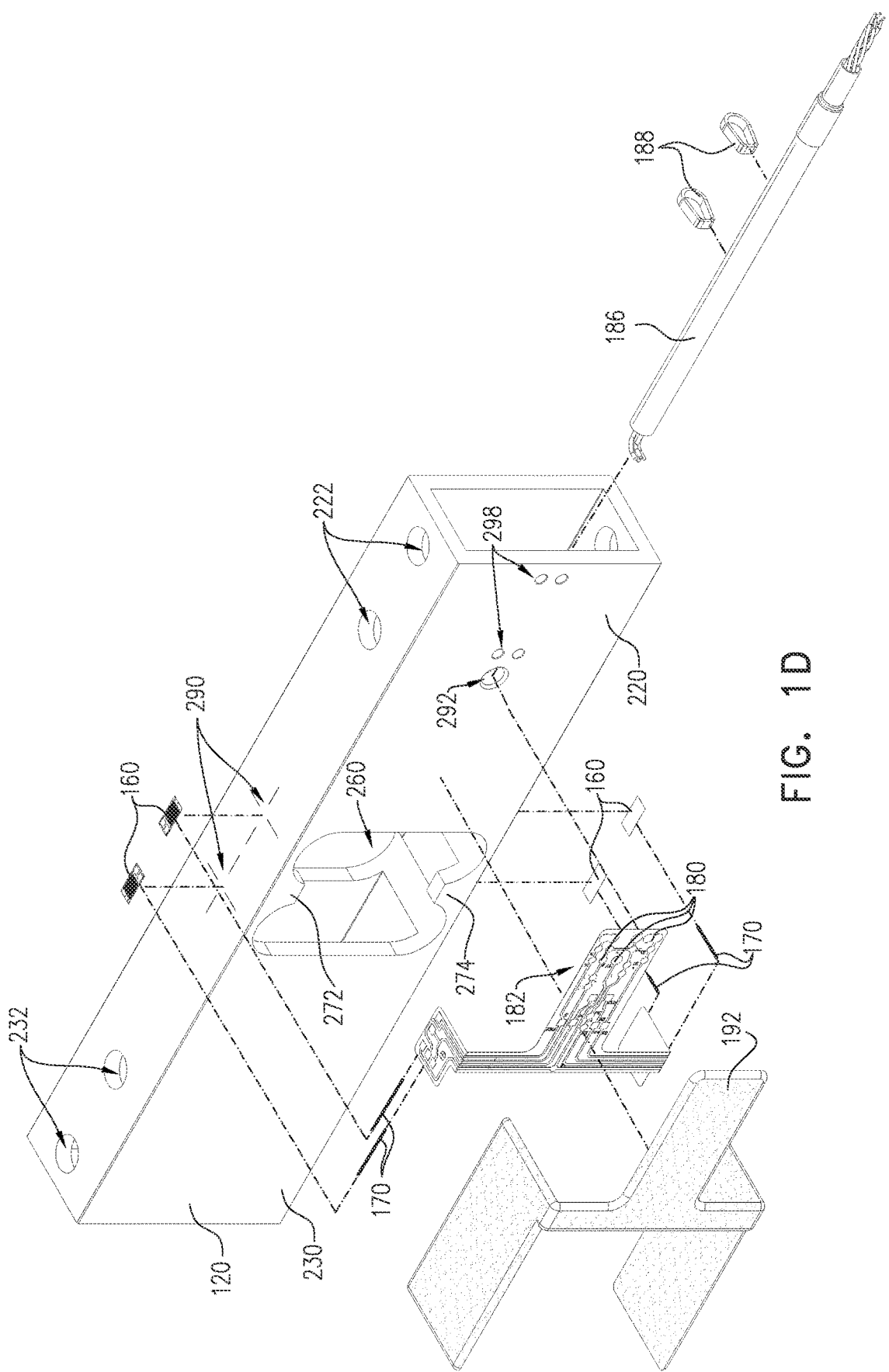
Figure 2A:
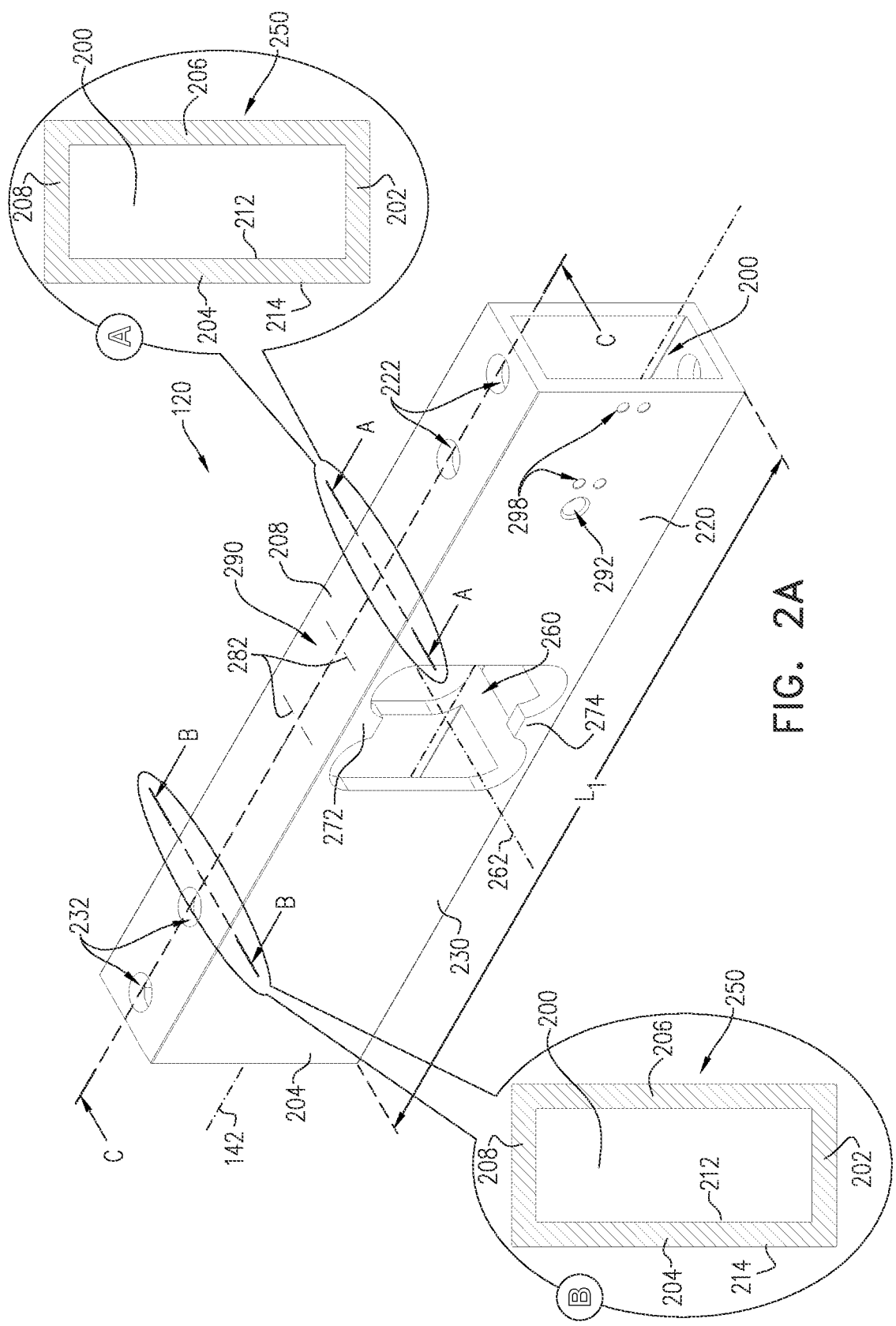
Figure 2C:
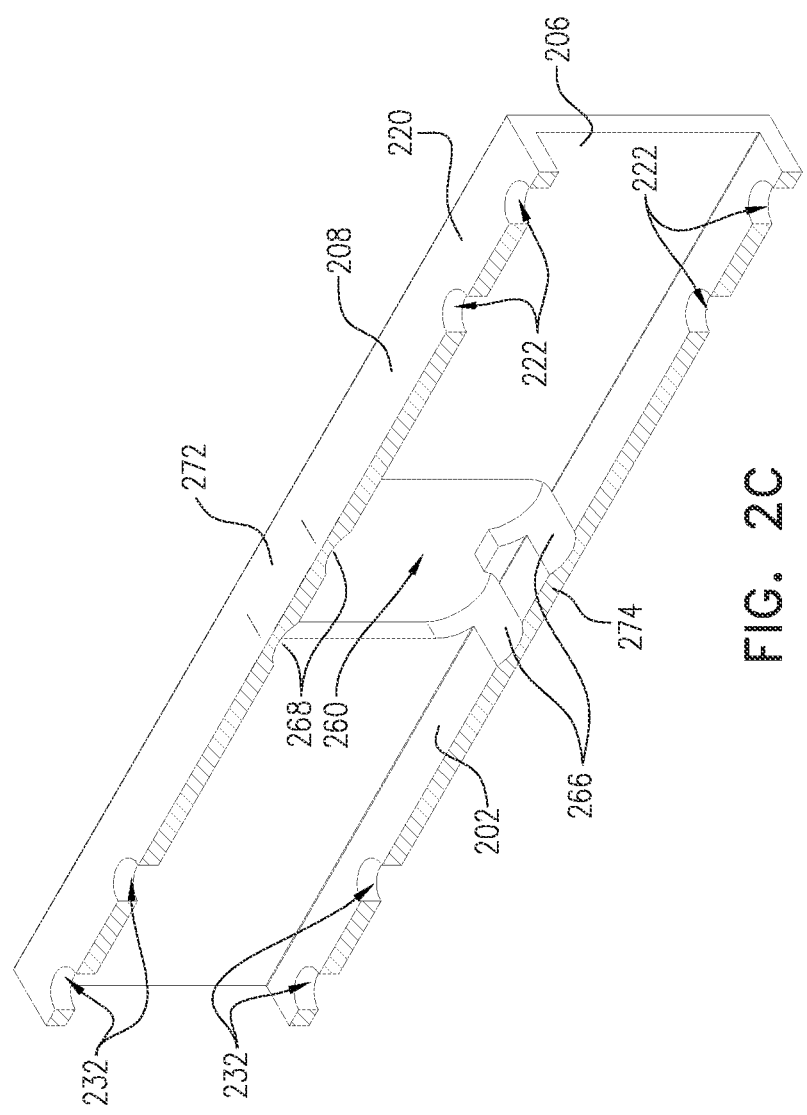

Reference is now made to FIGS. 1A-1D, which are simplified illustrations of an elongate force sensor assembly 100 constructed and operative in accordance with a first embodiment of the present invention, and to FIGS. 2A-2C, which are illustrations of an elongate force responsive beam element 120 of force sensor assembly 100 of FIGS. 1A-1D. It is appreciated that force sensor assembly 100 is operative to measure a force applied in a force application direction 130 which is parallel to a force application axis 132. It is appreciated that force application axis 132 is preferably perpendicular to a longitudinal axis 142 of elongate force beam responsive element 120. In a case wherein force sensor assembly 100 measures weight, force application axis 132 is generally parallel and/or antiparallel to a direction in which a gravitational force acts.

As seen in FIGS. 1A-2C, force sensor assembly 100 includes elongate force responsive beam element 120, which preferably extends along longitudinal axis 142. It is appreciated that elongate force responsive beam element 120 is an elastic element.

It is appreciated that as used herein, the term "elastic element" refers to an element of a transducer whose deflection in response to an applied force is sensed and converted into an output. As mentioned hereinabove, such an element is also referred to in the art as, inter alia, an elastic body, a spring element and a spring body. It is appreciated that elongate force responsive beam element 120 is typically not formed from an elastomer. Rather, as described hereinbelow, elongate force responsive beam element 120 is preferably made from a material, such as a suitable metal or other suitable solid material, which exhibits a linear relationship between the stress, namely an applied force, and strain, namely deformation of elongate force responsive beam element 120.

As seen particularly in FIGS. 1B-1D, force sensor assembly 100 preferably further includes at least one strain gauge 160, and more preferably a plurality of strain gauges 160, which are fixedly mounted on elongate force responsive beam element 120 and generate a strain gauge output in response to a force applied to force sensor assembly 100 in application direction 130.

In a preferred embodiment of the present invention, force sensor assembly 100 includes an even number of strain gauges 160, such as, inter alia, 2 strain gauges 160, 4 strain gauges 160, 6 strain gauges 160 or 8 strain gauges 160. Depending on the number of strain gauges 160 included in force sensor assembly 100, strain gauges 160 may be electrically connected to one another in, inter alia, a quarter-bridge configuration, a half-bridge configuration, a full bridge configuration, such as a Wheatstone bridge configuration, or a double-bridge configuration. In another embodiment of the present invention, force sensor assembly 100 includes an odd number of strain gauges 160.

In one embodiment of the present invention, strain gauges 160 may be affixed to elongate force responsive beam element 120 using any suitable mounting material, most typically an adhesive, such as, inter alia, a strain gauge bonding material, such as epoxy. In another embodiment of the present invention, strain gauges 160 may be deposited directly on elongate force responsive beam element 120, for example by vapor deposition.

Each strain gauge 160 may be embodied as any suitable strain gauge, including, inter alia, a foil strain gauge, a semiconductor strain gauge, a thin-film strain gauge, a thick-film strain gauge and a wire strain gauge. Preferably, all strain gauges 160 in force sensor assembly 100 are of the same class, and more preferably of the same model. In a preferred embodiment of the present invention, each of strain gauges 160 is embodied as a foil or wire strain gauge, such as an N2A-XX-S5105R-350/E5 strain gauge, commercially available from Vishay Precision Group, of Wendell, NC, USA.

Preferably, a plurality of electrically conductive elements (ECEs) 170, such as insulated copper conductors, electrically connect strain gauges 160 to a plurality of circuit elements 180, at least some of which are preferably included in a printed circuit board (PCB) 182, such as a flexible PCB. As described hereinabove, strain gauge or gauges 160 preferably generate a strain gauge output, more particularly, a resistance, in response to a deformation thereof, which deformation is dependent on the applied force. Preferably, at least some of circuit elements 180 convert the strain gauge output of strain gauge or gauges 160 into a force indication, indicating a magnitude of the applied force. As is well known in the art, the force indication generated by circuit elements 180 may be displayed to a user and/or used in calculations by an automated or semi-automated system. By way of example, circuit elements 180 may be embodied as a readout instrument, such as a VT300 commercially available from VPG Transducers of Ontario, CA, USA.

In a preferred embodiment of the present invention, force sensor assembly 100 further includes an electric cable 186, which electrically connects circuit elements 180 to external circuitry, including a power source (not shown). Preferably, a plurality of cable fasteners 188, such as, inter alia, cable ties, clamps or cable glands, affix electric cable 186 to elongate force responsive beam element 120, preferably to an inner surface of a wall thereof. In a preferred embodiment of the present invention, electric cable 186 includes multiple electrically conductive elements, for example, multiple insulated copper conductors. In the embodiment of the present invention illustrated in FIGS. 1A-1D, electric cable 186 is disposed within elongate force responsive beam element 120. In another embodiment of the present invention, electric cable 186 is disposed outside of elongate force responsive beam element 120.

In one embodiment of the present invention, PCB 182 may be affixed to elongate force responsive beam element 120 using a suitable mounting material, typically an adhesive, such as, inter alia, cyanoacrylate or acrylic, or using a protective cover element 192. In another embodiment of the present invention, PCB 182 is mounted on a support other than elongate force responsive beam element 120, for example, on a support (not shown) to which elongate force responsive beam element 120 of force sensor assembly 100 is mounted.

In the embodiment of the present invention shown in FIGS. 1A-1D, force sensor assembly 100 includes protective cover element 192 to protect and insulate strain gauges 160 and at least some of, and more preferably all of, circuit elements 180. It is appreciated that strain gauges 160 and circuit elements 180 which are protected by protective cover element 192 are disposed between elongate force responsive beam element 120 and protective cover element 192.

Protective cover element 192 may be formed of any suitable material, such as, inter alia, room-temperature-vulcanizing (RTV) silicone, vulcanized rubber or polyurethane, and is preferably affixed to elongate force responsive beam element 120. In one embodiment of the present invention, protective cover element 192 also serves to affix at least one of strain gauges 160 and circuit elements 180 to elongate force responsive beam element 120. In another embodiment of the present invention, force sensor assembly 100 may be hermetically sealed, over protective cover element 192. Alternatively, protective cover element 192 may be obviated when force sensor assembly 100 is hermetically sealed.

Turning now particularly to FIGS. 2A-2C, it is seen that elongate force responsive beam element 120 is formed with a throughgoing longitudinal bore 200 along longitudinal axis 142. Thus, elongate force responsive beam element 120 is hollow along longitudinal axis 142.

Longitudinal bore 200 is preferably generally enclosed by a generally planar rectangular bottom wall portion 202 of elongate force responsive beam element 120, a first generally planar rectangular side wall portion 204 of elongate force responsive beam element 120, a second generally planar rectangular side wall portion 206 of elongate force responsive beam element 120 and a generally planar rectangular top wall portion 208 of elongate force responsive beam element 120. It is appreciated that elongate force responsive beam element 120 is formed with an inner surface 212 and an outer surface 214, both of which preferably extend along all of wall portions 202, 204, 206 and 208.

Elongate force responsive beam element 120 is preferably characterized by an elongate dimension $L_1$ along longitudinal axis 142. In a preferred embodiment of the present invention, as seen in FIGS. 1A-2C, throughgoing longitudinal bore 200 extends along the entirety of elongate dimension $L_1$.

In a preferred embodiment of the present invention, as seen particularly in FIGS. 1A-1D, throughgoing longitudinal bore 200 may fully or partially house one or more elements of force sensor assembly 100, such as electric cable 186.

Preferably, elongate force responsive beam element 120 includes a mounting end 220, for fixedly mounting force sensor assembly 100 to a support (not shown). In the embodiment of the present invention shown in FIGS. 1A-2C, mounting end 220 includes, preferably formed in bottom and top wall portions 202 and 208, a plurality of mounting apertures 222 to receive mounting fasteners (not shown) for affixing elongate force responsive beam element 120 to the support. In another embodiment of the present invention, mounting apertures 222 may be obviated, and elongate force responsive beam element 120 is fixed to the support without using apertures, for example, by clamping mounting end 220 of elongate force responsive beam element 120 to the support.

Elongate force responsive beam element 120 further includes a loading end 230, being generally opposite mounting end 220 along longitudinal axis 142. In the embodiment of the present invention shown in FIGS. 1A-2C, loading end 230 includes, preferably formed in bottom and top wall portions 202 and 208, a plurality of fastener apertures 232 to receive platform fasteners (not shown) for affixing a loading platform (not shown), such as a weighing platform, to elongate force responsive beam element 120. In another embodiment of the present invention, apertures 232 may be obviated, and either no loading platform is used with force sensor assembly 100 or the loading platform is fastened to elongate force responsive beam element 120 without using apertures, for example, by clamping the loading platform to loading end 230 of elongate force responsive beam element 120.

Whether or not a loading platform is used in conjunction with force sensor assembly 100, force sensor assembly 100 is typically used by applying an applied force to loading end 230 of elongate force responsive beam element 120. Since loading end 230 is free to deflect in direction 130 and mounting end 220 is fixed, an applied force in direction 130 exerted upon loading end 230 causes a deformation of elongate force responsive beam element 120. Particularly, the deformation of elongate force responsive beam element 120 is typically characterized by an increase in a magnitude of elongate dimension $L_1$. As used herein, an undeformed state of elongate force responsive beam element 120 refers to a configuration of elongate force responsive beam element 120 when force sensor assembly 100 is not subject to an applied force other than those forces which always act on force sensor assembly 100, such as Earth's gravitational force.

As seen particularly in sectional enlargements A and B of FIG. 2A, which are taken along respective lines A-A and B-B of FIG. 2A, a cross-section 250 of elongate force responsive beam element 120 generally perpendicular to longitudinal axis 142 is hollow. It is appreciated that cross-section 250 is preferably hollow at both mounting end 220 and loading end 230 of elongate force responsive beam element 120.

In the embodiment shown in FIGS. 1A-2C, cross-section 250 is generally symmetric, and more particularly is generally rectangular. In another embodiment of the present invention, cross-section 250 may be any suitable shape, including, inter alia, square, circular, elliptic, triangular, hexagonal, and star-shaped, and the shape of cross-section 250 may be symmetric or non-symmetric. In one embodiment of the present invention, cross-section 250 is generally uniform at both mounting end 220 and loading end 230 of elongate force responsive beam element 120. In another embodiment of the present invention, cross-section 250 is not uniform at both mounting end 220 and loading end 230 of elongate force responsive beam element 120; for example, cross-section 250 may include additional, preferably threaded, material surrounding one or more of apertures 222 and 232.

It is appreciated that a shape and size of cross-section 250 is determined both by inner surface 212 and outer surface 214 of elongate force responsive beam element 120. In the embodiment illustrated in FIGS. 1A-2C, the shape of inner surface 212 at cross-section 250 is the same general shape as the shape of outer surface 214 at cross-section 250. In another embodiment of the present invention, the shape of inner surface 212 at cross-section 250 is different than the shape of outer surface 214 at cross-section 250.

In the embodiment shown in FIGS. 1A-2C, in addition to throughgoing longitudinal bore 200, elongate force responsive beam element 120 is also formed with a transverse bore 260 along a transverse axis 262. As seen particularly in FIG. 2A, transverse axis 262 is generally perpendicular to both force application axis 132 and to longitudinal axis 142. In a preferred embodiment of the present invention, at least one of strain gauges 160 and transverse bore 260 at least partially overlie one another, and more preferably all of strain gauges 160 and transverse bore 260 at least partially overlie one another. In the illustrated embodiment of the present invention, transverse bore 260 is a throughgoing bore which fully pierces both first and second side wall portions 204 and 206 of elongate force responsive beam element 120.

In the embodiment shown in FIGS. 1A— 2C, and as seen particularly in FIG. 2C, in addition to piercing first and second side wall portions 204 and 206 of elongate force responsive beam element 120, transverse bore 260 defines a plurality of bottom recesses 266 in inner surface 212 of bottom wall portion 202 of elongate force responsive beam element 120. Similarly, in the embodiment shown in FIGS. 1A-2C, and as seen particularly in FIG. 2C, transverse bore 260 defines a plurality of top recesses 268 in inner surface 212 of top wall portion 208 of elongate force responsive beam element 120. In another embodiment of the present invention, some or all of recesses 266 and 268 may be obviated.

It is appreciated that transverse bore 260 preferably acts as a binocular strain engine and, together with elongate force responsive beam element 120, defines an upper beam 272 and a lower beam 274. Thus, force sensor assembly 100 is preferably a multi-beam force sensor, and in a preferred embodiment of the present invention, is a single-point force sensor, such as a single-point load cell.

In the embodiment illustrated in FIGS. 1A-2C, upper beam 272 is formed with markings 282, which are preferably formed on outer surface 214 of top wall portion 208 of elongate force responsive beam element 120. Similarly, in the embodiment illustrated in FIGS. 1A-2C, lower beam 274 is formed with markings 284, which are preferably formed on outer surface 214 of bottom wall portion 202 of elongate force responsive beam element 120. In another embodiment of the present invention, some or all of markings 282 and 284 may be obviated.

Markings 282 and 284 preferably indicate a plurality of strain positions 290 to which strain gauges 160 are to be affixed. In the embodiment shown in FIGS. 1A-2C, each of strain positions 290 is aligned with one of recesses 266 and 268, and the geometry of transverse bore 260 results in strains of generally equal magnitude being present at each of strain positions 290 as a result of the applied force.

It is appreciated that in a preferred embodiment of the present invention, transverse bore 260 is shaped to compensate for eccentricity, such that force sensor assembly 100 provides a force indication output that is uniform within a predetermined tolerance for off-center loading, wherein the applied force is incident anywhere within a predetermined locus of loading end 230.

In a preferred embodiment of the present invention, elongate force responsive beam element 120 is further formed with an electrical communication aperture 292, preferably in side wall portion 204, to allow electrical communication between electric cable 186 and PCB 182. Elongate force responsive beam element 120 is preferably further formed with a plurality of fastener apertures 298, preferably in side wall portion 204, which are operative to receive cable fasteners 188 for the affixation of electric cable 186 to elongate force responsive beam element 120.

In one embodiment of the present invention, elongate force responsive beam element 120 is formed of a metal, such as an aluminum alloy or a steel alloy. In another embodiment of the present invention, elongate force responsive beam element 120 is formed of a composite material, which may be either a metal matrix composite material or a non-metal matrix composite material, such as, inter alia, a carbon composite or fiberglass.

As described hereinbelow with reference to FIG. 3, elongate force responsive beam element 120 may be formed by any suitable process, including, inter alia, an extrusion process, a drawing process, a rolling process, a tube forming process, which may be either a seamed tube forming process or a seamless tube forming process, a forging process, a three-dimensional (3D) printing process a metal injection molding (MIM) process and a machining process.

Similarly, each of transverse bore 260 and apertures 222, 232, 292 and 298 may be formed by any suitable process, including, inter alia, machining, electrical discharge machining (EDM), broaching, erosion and ablation.

Figure 3:
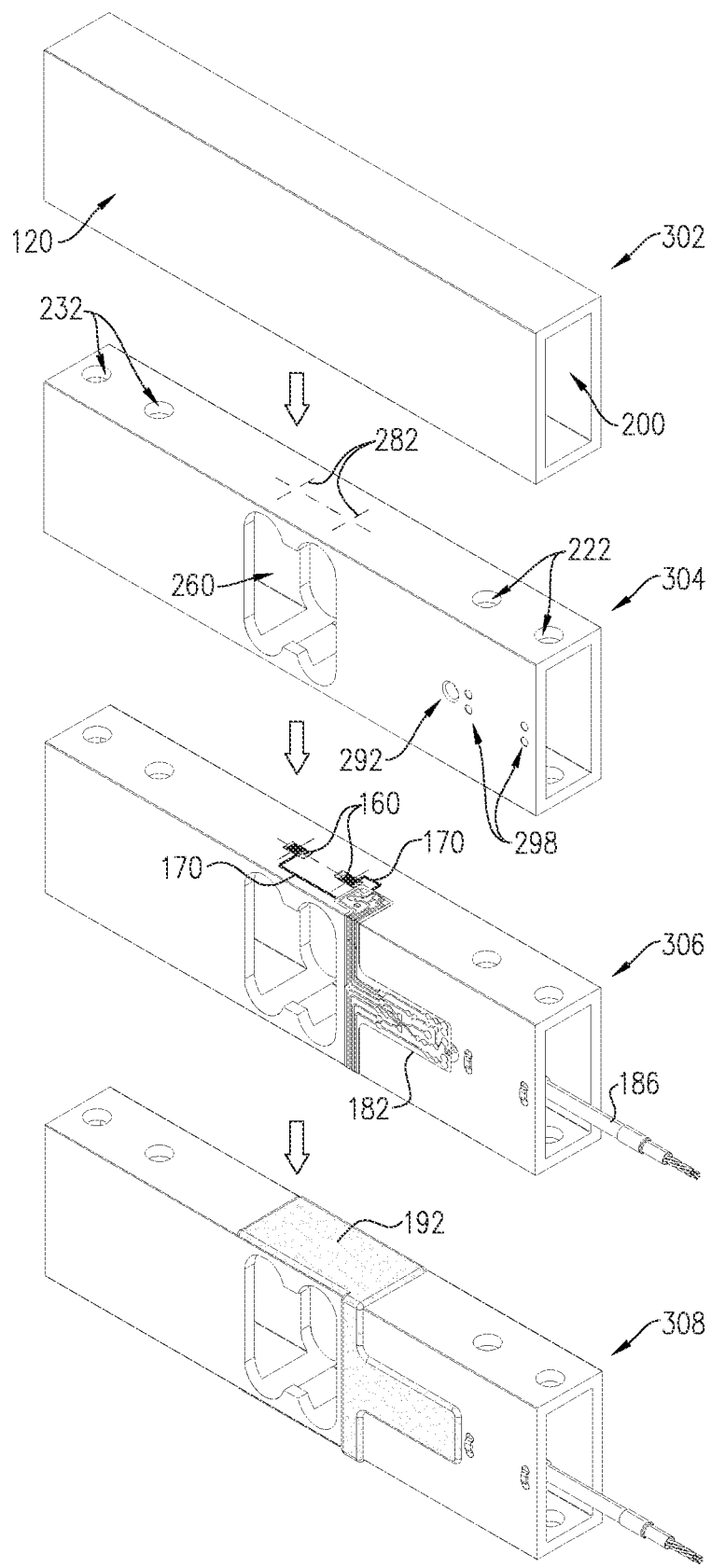
FIG. 3 is a simplified illustration of a method for manufacturing the force sensor assembly of FIGS. 1A-2C.

Reference is now made to FIG. 3, which is a simplified illustration of a method for manufacturing force sensor assembly 100 of FIGS. 1A-2C. As seen at a fabrication step 302, the method begins by fabricating elongate force responsive beam element 120. As described hereinabove with particular reference to FIGS. 2A-2C, elongate force responsive beam element 120 preferably extends along longitudinal axis 142, which is generally perpendicular to force application axis 132, and elongate force responsive beam element 120 is preferably formed with throughgoing longitudinal bore 200 along longitudinal axis 142.

As noted above, fabrication step 302 may be any suitable process, including, inter alia, an extrusion process, a drawing process, a rolling process, a tube forming process, which may be either a seamed tube forming process or a seamless tube forming process, a forging process, a three-dimensional (3D) printing process, a metal injection molding (MIM) process and a machining process.

In a preferred embodiment of the present invention, bore 200 is formed together with elongate force responsive beam element 120. For example, when using an extrusion process for fabrication step 302, a hollow extrusion profile produced at fabrication step 302 defines all of wall portions 202, 204, 206 and 208 as well as bore 200 of elongate force responsive beam element 120. Thus, in such an embodiment, preferably no subtractive processes are required to form bore 200.

In contrast, in embodiments wherein fabrication step 302 is a subtractive process, bore 200 is preferably formed after an initial formation step of elongate force responsive beam element 120. For example, at fabrication step 302, a solid bar may first be produced, which may then be machined to form bore 200 therein, thereby producing elongate force responsive beam element 120.

In one embodiment of the present invention, fabrication step 302 produces beams each having an elongate dimension which is longer than elongate dimension $L_1$. In such an embodiment, fabrication step 302 includes cutting each beam into lengths each having an elongate dimension equal to or nearly equal to $L_1$.

As seen at a detailing step 304, apertures in elongate force responsive beam element 120, including apertures 222 and 232, transverse bore 260, electrical communication aperture 292 and fastener apertures 298 are formed. In an embodiment wherein markings, such as markings 282 and 284, are formed on elongate force responsive beam element 120, the markings are also preferably formed at detailing step 304. It is appreciated that the apertures in and markings on elongate force responsive beam element 120 may be formed by any suitable process, including, inter alia, machining, electrical discharge machining (EDM), broaching, erosion and ablation.

As described hereinabove with reference to FIGS. 2A-2C, transverse bore 260 is preferably a throughgoing transverse bore extending along transverse axis 262, which is preferably generally perpendicular to both force application axis 132 and to longitudinal axis 142. Additionally, as described hereinabove with reference to FIGS. 2A-2C, at least one, and more preferably all of, strain gauges 160 and transverse bore 260 preferably at least partially overlie one another.

As seen at an assembly step 306, at least one strain gauge 160 is preferably affixed to elongate force responsive beam element 120. As described hereinabove with particular reference to FIGS. 1A-1D, strain gauge or gauges 160 preferably generate a strain gauge output in response to a force applied in a force application direction 130. Also at assembly step 306, strain gauge or gauges 160 are preferably connected, using ECEs 170, to circuit elements 180, which in the embodiment shown in FIGS. 1A-3, are affixed to elongate force responsive beam element 120, but need not be affixed to elongate force responsive beam element 120.

As described hereinabove with particular reference to FIGS. 1A-1D, at least some of circuit elements 180 preferably convert the strain gauge output of strain gauge or gauges 160 into a force indication, indicating a magnitude of the applied force. As described hereinabove with particular reference to FIGS. 1A-1D, strain gauge or gauges 160 and circuit elements 180 are preferably fixedly mounted to elongate force responsive beam element 120 using any suitable mounting material, most typically an adhesive, such as, inter alia, cyanoacrylate, acrylic or epoxy, or using protective cover element 192. It is appreciated that the mounting material used to affix circuit elements 180 to elongate force responsive beam element 120 may be the same mounting material used to affix strain gauge or gauges 160 to elongate force responsive beam element 120. Alternatively, the mounting material used to affix circuit elements 180 to elongate force responsive beam element 120 may be a different mounting material than that used to affix strain gauge or gauges 160 to elongate force responsive beam element 120. Also at assembly step 306, electric cable 186 is preferably electrically connected to circuit elements 180, and electric cable 186 is preferably fixedly mounted to elongate force responsive beam element 120, preferably using cable fasteners 188.

As seen in a sealing step 308, protective cover element 192 is preferably affixed to elongate force responsive beam element 120. It is appreciated that in an embodiment in which protective cover element 192 affixes at least one of strain gauges 160 and circuit elements 180 to elongate force responsive beam element 120, assembly step 306 and sealing step 308 are typically combined into a single step.

In another embodiment of the present invention, force sensor assembly 100 is hermetically sealed at sealing step 308, and protective cover element 192 may be obviated. Alternatively, sealing step 308 hermetically seals force sensor assembly 100 following attachment of protective cover element 192.

Figure 4A:
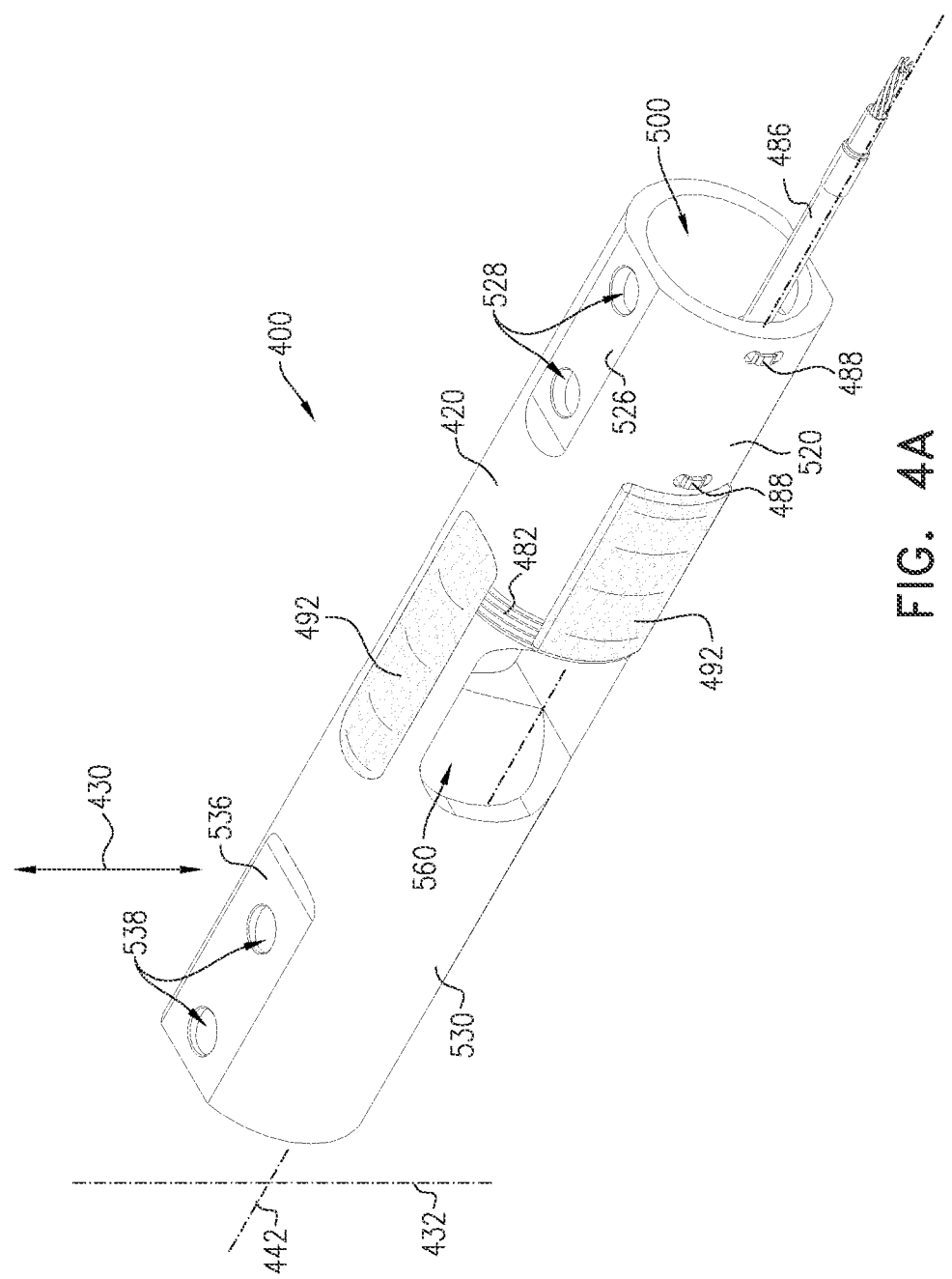
FIGS. 4A, 4B, 4C and 4D are simplified respective assembled, top-facing partly exploded, bottom-facing partly exploded and top-facing fully exploded illustrations of an elongate force sensor assembly constructed and operative in accordance with another embodiment of the present invention.
Figure 4B:
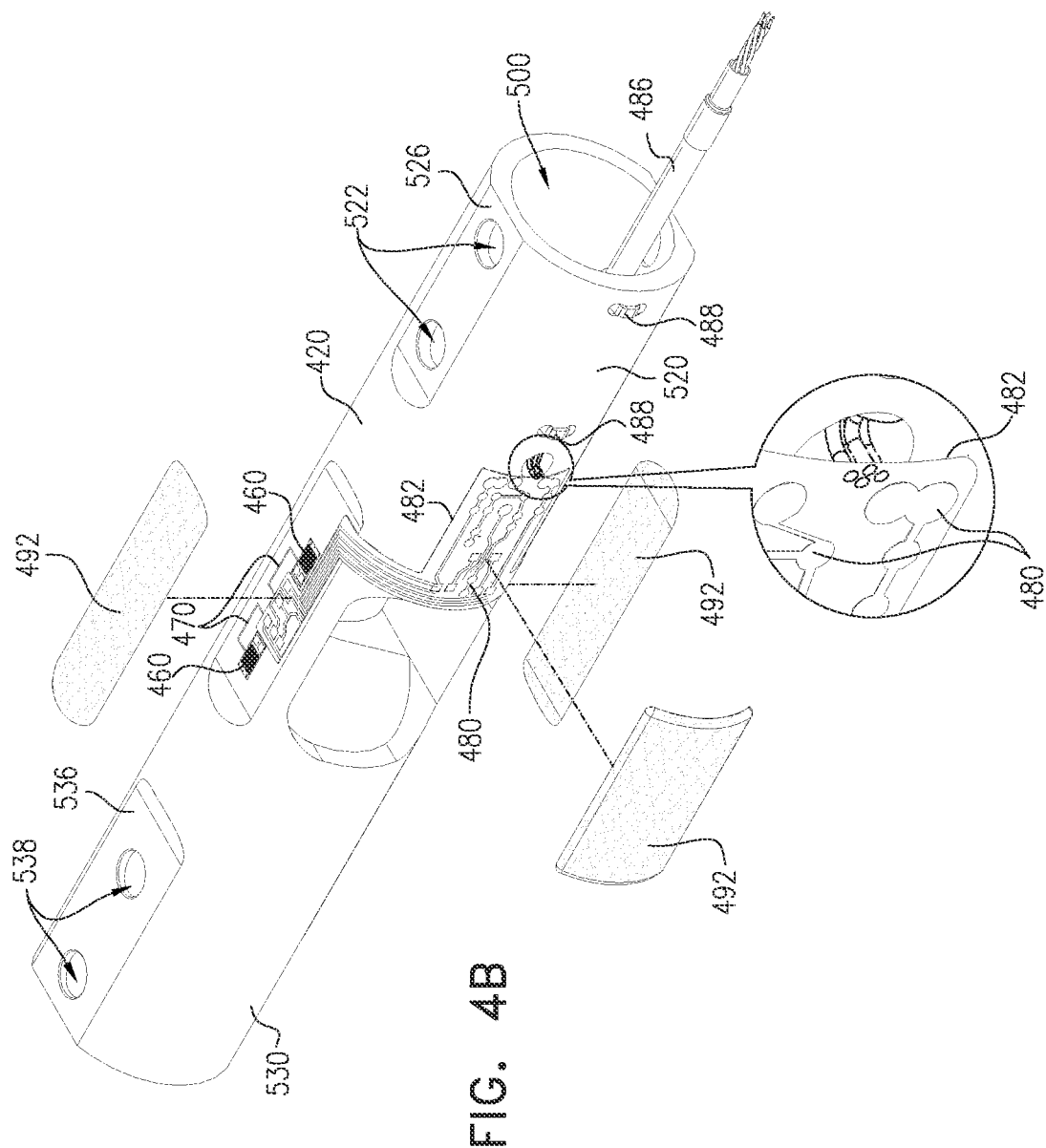
Figure 4C:
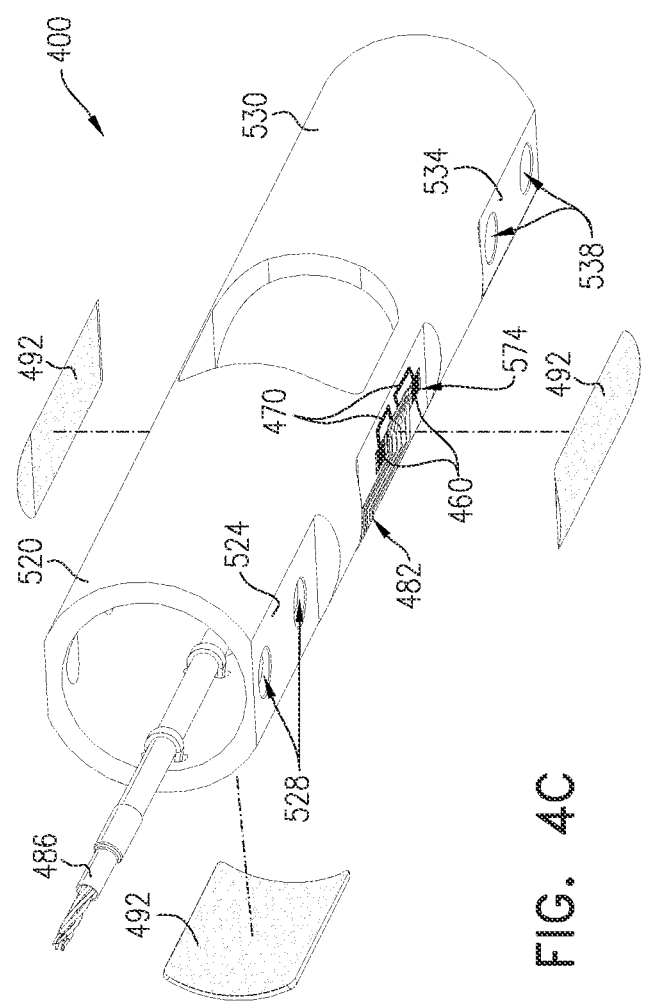
Figure 4D:
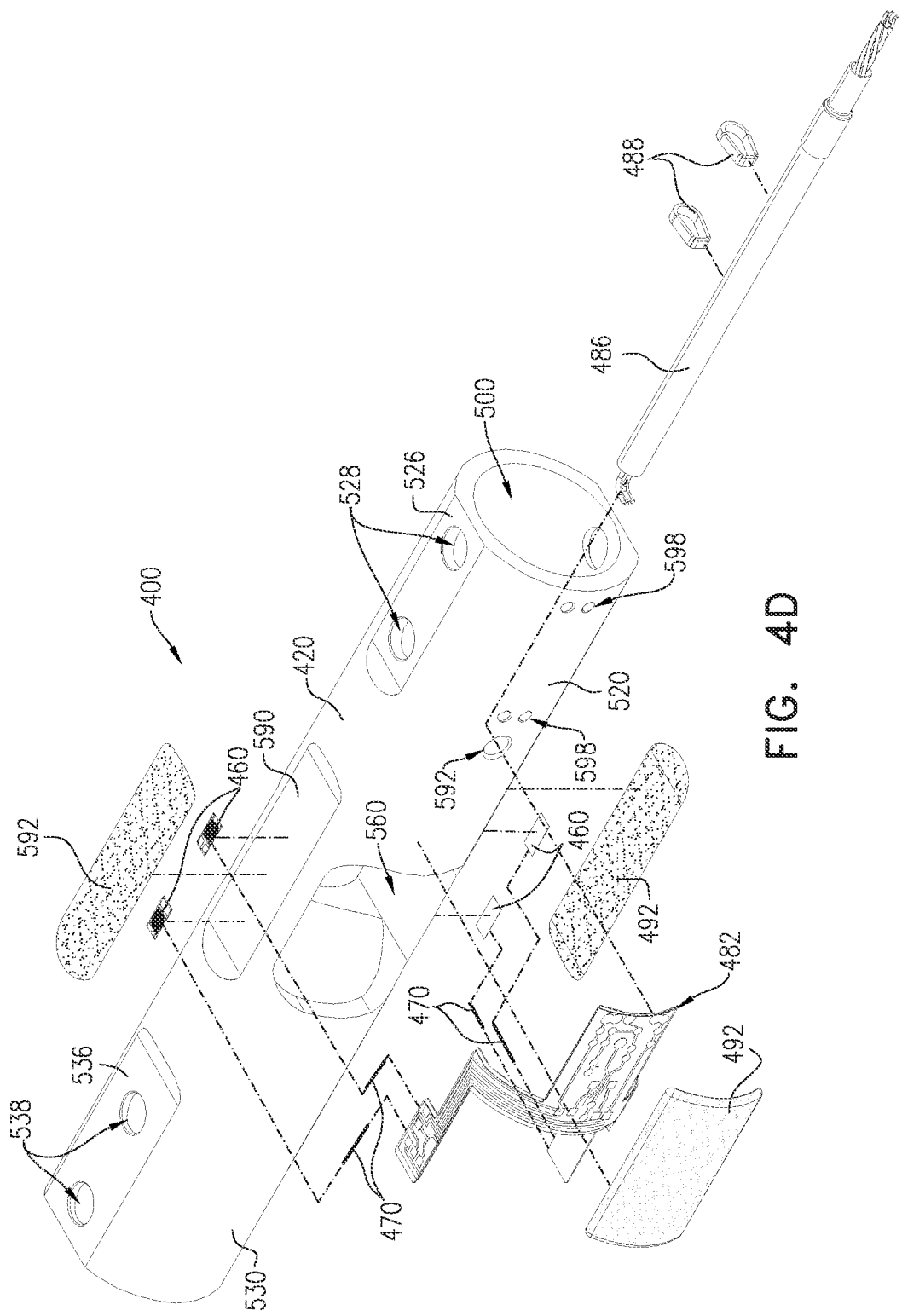
Figure 5A:
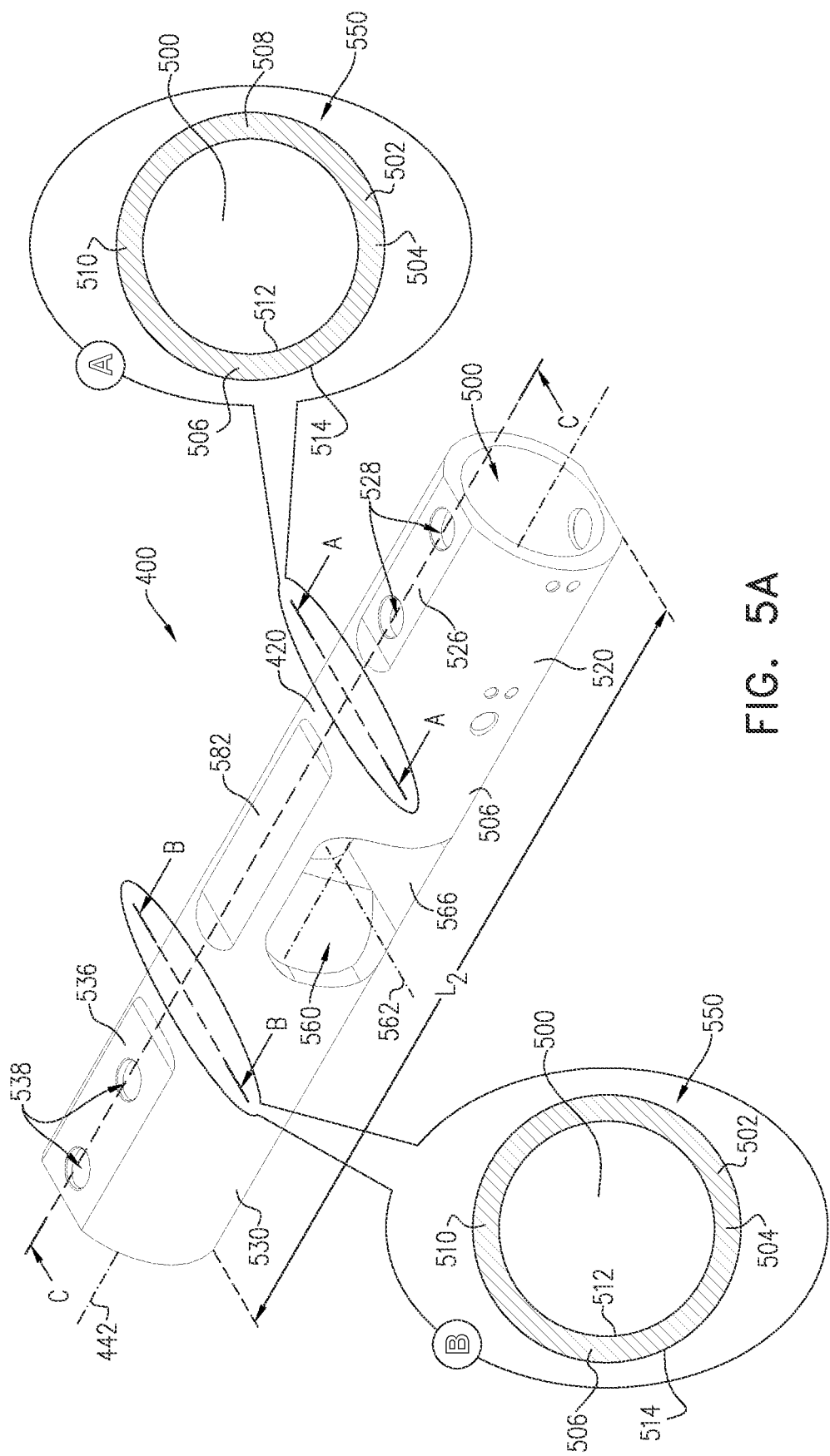
FIGS. 5A, 5B and 5C are simplified respective top-facing perspective, bottom-facing perspective and sectional illustrations of an elongate force responsive beam element of the force sensor assembly of FIGS. 4A-4D, FIG. 5C being taken along sectional line C-C in FIG. 5A.
Figure 5B:
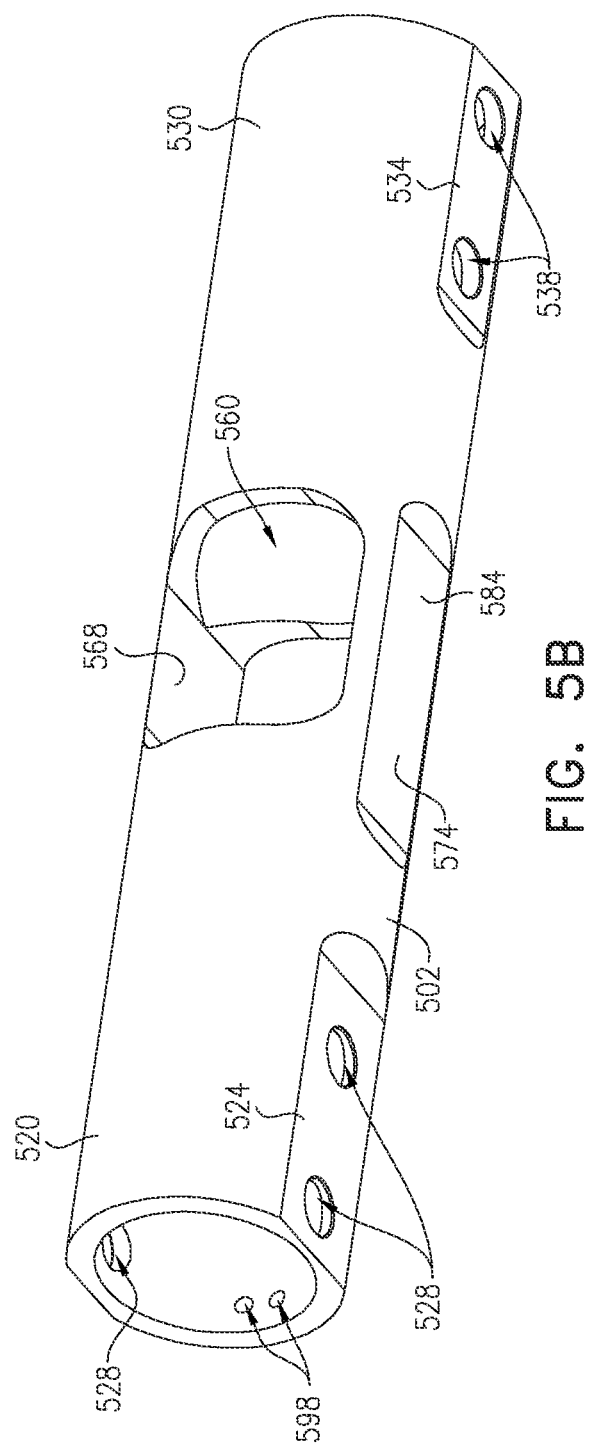
Figure 5C:
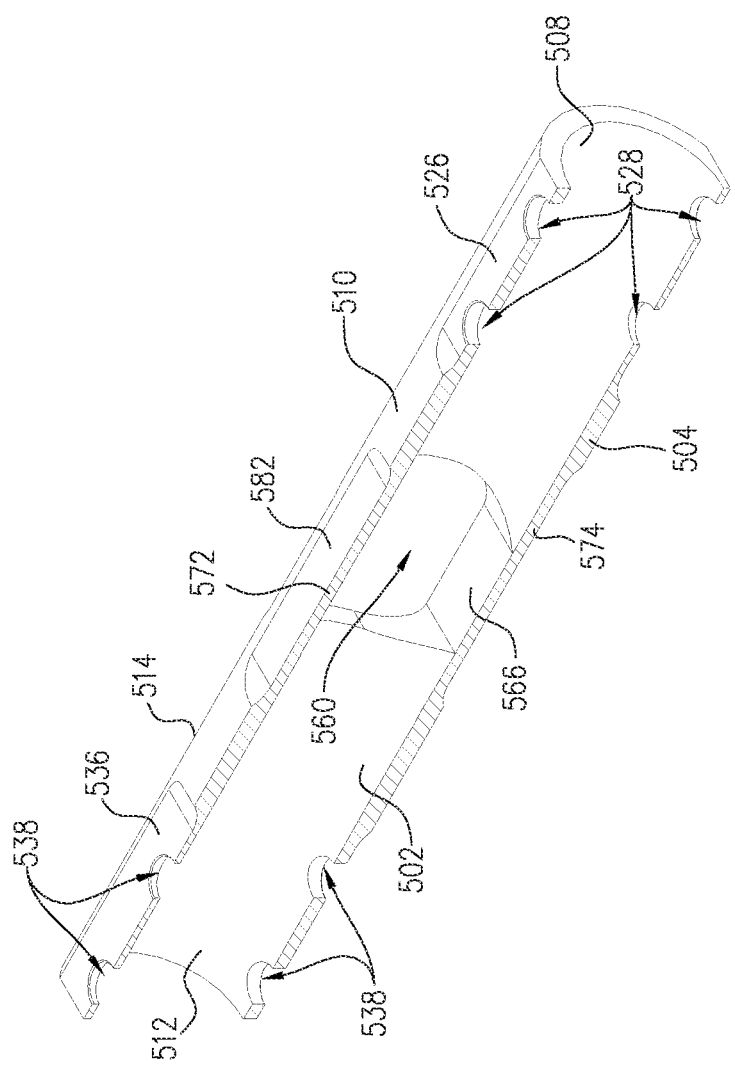

Reference is now made to FIGS. 4A-4D, which are simplified illustrations of an elongate force sensor assembly 400 constructed and operative in accordance with an additional embodiment of the present invention, and to FIGS. 5A-5C, which are illustrations of an elongate force responsive beam element 420 of force sensor assembly 400 of FIGS. 4A-4D. It is appreciated that force sensor assembly 400 is operative to measure a force applied in a force application direction 430 which is parallel to a force application axis 432. It is appreciated that force application axis 432 is preferably perpendicular to a longitudinal axis 442 of elongate force responsive beam element 420. In a case wherein force sensor assembly 400 measures weight, force application axis 432 is generally parallel and/or antiparallel to a direction in which a gravitational force acts.

As seen in FIGS. 4A-5C, force sensor assembly 400 includes elongate force responsive beam element 420, which preferably extends along longitudinal axis 442. In a preferred embodiment of the present invention, longitudinal axis 442 is generally perpendicular to force application axis 432. It is appreciated that elongate force responsive beam element 420 is an elastic element.

It is appreciated that, as described hereinabove, the term "elastic element" refers to an element of a transducer whose deflection in response to an applied force is sensed and converted into an output. Such an element is also referred to in the art as, inter alia, an elastic body, a spring element and a spring body. It is appreciated that elongate force responsive beam element 420 is typically not formed from an elastomer. Rather, as described hereinbelow, elongate force responsive beam element 420 is preferably made from a material, such as a suitable metal or other suitable solid material, which exhibits a linear relationship between the stress, namely an applied force, and strain, namely deformation of elongate force responsive beam element 420.

As seen particularly in FIGS. 4B-4D, force sensor assembly 400 preferably further includes at least one strain gauge 460, and more preferably a plurality of strain gauges 460, which are fixedly mounted on elongate force responsive beam element 420 and generate a strain gauge output in response to a force applied to force sensor assembly 400 in application direction 430.

In a preferred embodiment of the present invention, force sensor assembly 400 includes an even number of strain gauges 460, such as, inter alia, 2 strain gauges 460, 4 strain gauges 460, 6 strain gauges 460 or 8 strain gauges 460. Depending on the number of strain gauges 460 included in force sensor assembly 400, strain gauges 460 may be electrically connected to one another in, inter alia, a quarter-bridge configuration, a half-bridge configuration, a full bridge configuration, such as a Wheatstone bridge configuration, or a double-bridge configuration. In another embodiment of the present invention, force sensor assembly 400 includes an odd number of strain gauges 460.

In one embodiment of the present invention, strain gauges 460 may be affixed to elongate force responsive beam element 420 using any suitable mounting material, most typically an adhesive, such as, inter alia, a strain gauge bonding material, such as epoxy. In another embodiment of the present invention, strain gauges 460 may be deposited directly on elongate force responsive beam element 420, for example by vapor deposition.

Each strain gauge 460 may be embodied as any suitable strain gauge, including, inter alia, a foil strain gauge, a semiconductor strain gauge, a thin-film strain gauge, a thick-film strain gauge and a wire strain gauge. Preferably, all strain gauges 460 in force sensor assembly 400 are of the same class, and more preferably of the same model. In a preferred embodiment of the present invention, each of strain gauges 460 is embodied as a foil or wire strain gauge, such as an N2A-XX-S5105R-350/E5 strain gauge, commercially available from Vishay Precision Group, of Wendell, NC, USA.

Preferably, a plurality of electrically conductive elements (ECEs) 470, such as insulated copper conductors, electrically connect strain gauges 460 to a plurality of circuit elements 480, at least some of which are preferably included in a printed circuit board (PCB) 482, such as a flexible PCB. As described hereinabove, strain gauge or gauges 460 preferably generate a strain gauge output, more particularly, a resistance, in response to a deformation thereof, which deformation is dependent on the applied force. Preferably, at least some of circuit elements 480 convert the strain gauge output of strain gauge or gauges 460 into a force indication, indicating a magnitude of the applied force. As is well known in the art, the force indication generated by circuit elements 480 may be displayed to a user and/or used in calculations by an automated or semi-automated system. By way of example, circuit elements 480 may be embodied as a readout instrument, such as a VT300 commercially available from VPG Transducers of Ontario, CA, USA.

In a preferred embodiment of the present invention, force sensor assembly 400 further includes an electric cable 486, which electrically connects circuit elements 480 to external circuitry, including a power source (not shown). Preferably, a plurality of cable fasteners 488, such as, inter alia, cable ties, clamps or cable glands, affix electric cable 486 to elongate force responsive beam element 420, preferably to an inner surface of a wall portion thereof. In a preferred embodiment of the present invention, electric cable 486 includes multiple electrically conductive elements, for example, multiple insulated copper conductors. In the embodiment of the present invention illustrated in FIGS. 4A-4D, electric cable 486 is disposed within elongate force responsive beam element 420. In another embodiment of the present invention, electric cable 486 is disposed outside of elongate force responsive beam element 420.

In one embodiment of the present invention, PCB 482 may be affixed to elongate force responsive beam element 420 using a suitable mounting material, typically an adhesive, such as, inter alia, cyanoacrylate or acrylic, or using at least one protective cover element 492. In another embodiment of the present invention, PCB 482 is mounted on a support other than elongate force responsive beam element 420, for example, on a support (not shown) to which elongate force responsive beam element 420 of force sensor assembly 400 is mounted.

In the embodiment of the present invention shown in FIGS. 4A-4D, force sensor assembly 400 includes protective cover elements 492 to protect and insulate strain gauges 460 and at least some of circuit elements 480. It is appreciated that strain gauges 460 and circuit elements 480 which are protected by protective cover elements 492 are disposed between elongate force responsive beam element 420 and one of protective cover elements 492.

Protective cover elements 492 may be formed of any suitable material, such as, inter alia, room-temperature-vulcanizing (RTV) silicone, vulcanized rubber or polyurethane, and are preferably affixed to elongate force responsive beam element 420. In one embodiment of the present invention, protective cover elements 492 also serve to affix at least one of strain gauges 460 and circuit elements 480 to elongate force responsive beam element 420. In another embodiment of the present invention, force sensor assembly 400 may be hermetically sealed, over protective cover elements 492. Alternatively, protective cover elements 492 may be obviated when force sensor assembly 400 is hermetically sealed.

Turning now particularly to FIGS. 5A-5C, it is seen that elongate force responsive beam element 420 is formed with a throughgoing longitudinal bore 500 along longitudinal axis 442. Thus, elongate force responsive beam element 420 is hollow along longitudinal axis 442.

Longitudinal bore 500 is preferably generally enclosed by a generally cylindrical wall 502 of elongate force responsive beam element 420, cylindrical wall 502 having a bottom portion 504, a first side portion 506, a second side portion 508 and a top portion 510. It is appreciated that elongate force responsive beam element 420 is formed with an inner surface 512 and an outer surface 514, both of which preferably extend along all of cylindrical wall 502.

Elongate force responsive beam element 420 is preferably characterized by an elongate dimension $L_2$ along longitudinal axis 442. In a preferred embodiment of the present invention, as seen in FIGS. 4A-5C, throughgoing longitudinal bore 500 extends along the entirety of elongate dimension $L_2$.

In a preferred embodiment of the present invention, as seen particularly in FIGS. 4A-4D, throughgoing longitudinal bore 500 may fully or partially house one or more elements of force sensor assembly 400, such as electric cable 486.

Preferably, elongate force responsive beam element 420 includes a mounting end 520, for fixedly mounting force sensor assembly 400 to a support (not shown). In the embodiment of the present invention shown in FIGS. 4A-5C, at mounting end 520, bottom portion 504 of cylindrical wall 502 includes a flattened area 524 on outer surface 514, and top portion 510 of cylindrical wall 502 includes a flattened area 526 on outer surface 514.

Preferably, formed in flattened areas 524 and 526 is a plurality of mounting apertures 528 to receive mounting fasteners (not shown) for affixing elongate force responsive beam element 420 to the support. In another embodiment of the present invention, mounting apertures 528 may be obviated, and elongate force responsive beam element 420 is fixed to the support without using apertures, for example, by clamping mounting end 520 of elongate force responsive beam element 420 to the support.

Elongate force responsive beam element 420 further includes a loading end 530, being generally opposite mounting end 520 along longitudinal axis 442. In the embodiment of the present invention shown in FIGS. 4A-5C, at loading end 530, bottom portion 504 of cylindrical wall 502 includes a flattened area 534 on outer surface 514, and top portion 510 of cylindrical wall 502 includes a flattened area 536 on outer surface 514.

Preferably, formed in flattened areas 534 and 536 is a plurality of fastener apertures 538 to receive platform fasteners (not shown) for affixing a loading platform (not shown), such as a weighing platform, to elongate force responsive beam element 420. In another embodiment of the present invention, apertures 538 may be obviated, and either no loading platform is used with force sensor assembly 400 or the loading platform is fastened to elongate force responsive beam element 420 without using apertures, for example, by clamping the loading platform to loading end 530 of elongate force responsive beam element 420.

Whether or not a loading platform is used in conjunction with force sensor assembly 400, force sensor assembly 400 is typically used by applying an applied force to loading end 530 of elongate force responsive beam element 420. Since loading end 530 is free to deflect in direction 430 and mounting end 520 is fixed, an applied force in direction 430 exerted upon loading end 530 causes a deformation of elongate force responsive beam element 420. Particularly, the deformation of elongate force responsive beam element 420 is typically characterized by an increase in a magnitude of elongate dimension $L_2$. As used herein, an undeformed state of elongate force responsive beam element 420 refers to a configuration of elongate force responsive beam element 420 when force sensor assembly 400 is not subject to an applied force other than those forces which always act on force sensor assembly 400, such as Earth's gravitational force.

As seen particularly in sectional enlargements A and B of FIG. 5A, which are taken along respective lines A-A and B-B of FIG. 5A, a cross-section 550 of elongate force responsive beam element 420 generally perpendicular to longitudinal axis 442 is hollow. It is appreciated that cross-section 550 is preferably hollow at both mounting end 520 and loading end 530 of elongate force responsive beam element 420.

In the embodiment shown in FIGS. 4A-5C, cross-section 550 is generally symmetric, and more particularly is generally circular. In another embodiment of the present invention, cross-section 550 may be any suitable shape, including, inter alia, square, rectangular, elliptic, triangular, hexagonal, and star-shaped, and the shape of cross-section 550 may be symmetric or non-symmetric. In one embodiment of the present invention, cross-section 550 is generally uniform at both mounting end 520 and loading end 530 of elongate force responsive beam element 420. In another embodiment of the present invention, cross-section 550 is not uniform at both mounting end 520 and loading end 530 of elongate force responsive beam element 420; for example, cross-section 550 may include additional, preferably threaded, material surrounding one or more of apertures 528 and 538.

It is appreciated that a shape and size of cross-section 550 is determined both by inner surface 512 and outer surface 514 of elongate force responsive beam element 420. In the embodiment illustrated in FIGS. 4A-5C, the shape of inner surface 512 at cross-section 550 is the same general shape as the shape of outer surface 514 at cross-section 550. In another embodiment of the present invention, the shape of inner surface 512 at cross-section 550 is different than the shape of outer surface 514 at cross-section 550.

In the embodiment shown in FIGS. 4A-5C, in addition to throughgoing longitudinal bore 500, elongate force responsive beam element 420 is also formed with a transverse bore 560 along a transverse axis 562. As seen particularly in FIG. 5A, transverse axis 562 is generally perpendicular to both force application axis 432 and to longitudinal axis 442. In a preferred embodiment of the present invention, at least one of strain gauges 460 and transverse bore 560 at least partially overlie one another, and more preferably all of strain gauges 460 and transverse bore 560 at least partially overlie one another. In the illustrated embodiment of the present invention, transverse bore 560 is a throughgoing bore which fully pierces both first and second side portions 506 and 508 of elongate force responsive beam element 420.

In the embodiment shown in FIGS. 4A-5C, in addition to piercing first and second side portions 506 and 508 of elongate force responsive beam element 420, transverse bore 560 defines a flattened area 566 in inner surface 512 of bottom portion 504 of cylindrical wall 502 of elongate force responsive beam element 420. Similarly, in the embodiment shown in FIGS. 4A-5C, transverse bore 560 defines a flattened area 568 in inner surface 512 of top portion 510 of cylindrical wall 502 of elongate force responsive beam element 420. In another embodiment of the present invention, one or both of flattened areas 566 and 568 may be obviated.

It is appreciated that transverse bore 560 preferably acts as a dual guided beam strain engine and, together with elongate force responsive beam element 420, defines an upper beam 572 and a lower beam 574. Thus, force sensor assembly 400 is preferably a multi-beam force sensor, and in a preferred embodiment of the present invention, is a single-point force sensor, such as a single-point load cell.

In the embodiment illustrated in FIGS. 4A-5C, upper beam 572 is formed with a flattened area 582, which is preferably formed on outer surface 514 of top portion 510 of cylindrical wall 502 of elongate force responsive beam element 420. Similarly, in the embodiment illustrated in FIGS. 4A-5C, lower beam 574 is formed with a flattened area 584, which is preferably formed on outer surface 514 of bottom portion 504 of cylindrical wall 502 of elongate force responsive beam element 420.

Flattened areas 582 and 584 preferably provide a plurality of strain positions 590 at which strain gauges 460 are affixed. In the embodiment shown in FIGS. 4A-5C, the geometry of transverse bore 560 results in strains of generally equal magnitude being present at each of strain positions 590 as a result of the applied force.

It is appreciated that in a preferred embodiment of the present invention, transverse bore 560 is shaped to compensate for eccentricity, such that force sensor assembly 400 provides a force indication output that is uniform within a predetermined tolerance for off-center loading, wherein the applied force is incident anywhere within a predetermined locus of loading end 530.

In a preferred embodiment of the present invention, elongate force responsive beam element 420 is further formed with an electrical communication aperture 592, preferably in side portion 506 of cylindrical wall 502, to allow electrical communication between electric cable 486 and PCB 482. Elongate force responsive beam element 420 is preferably further formed with a plurality of fastener apertures 598, preferably in side portion 506 of cylindrical wall 502, which are operative to receive cable fasteners 488 for the affixation of electric cable 486 to elongate force responsive beam element 420.

In one embodiment of the present invention, elongate force responsive beam element 420 is formed of a metal, such as an aluminum alloy or a steel alloy. In another embodiment of the present invention, elongate force responsive beam element 420 is formed of a composite material, which may be either a metal matrix composite material or a non-metal matrix composite material, such as, inter alia, a carbon composite or fiberglass.

As described hereinbelow with reference to FIG. 6, elongate force responsive beam element 420 may be formed by any suitable process, including, inter alia, an extrusion process, a drawing process, a rolling process, a tube forming process, which may be either a seamed tube forming process or a seamless tube forming process, a forging process, a three-dimensional (3D) printing process, a metal injection molding (MIM) process and a machining process.

Similarly, each of transverse bore 560, apertures 528 and 538, electrical communication aperture 592 and fastener apertures 598, as well as flattened areas 524, 526, 534, 536, 566, 568, 582 and 584 may be formed by any suitable process, including, inter alia, machining, electrical discharge machining (EDM), broaching, erosion and ablation.

Figure 6:
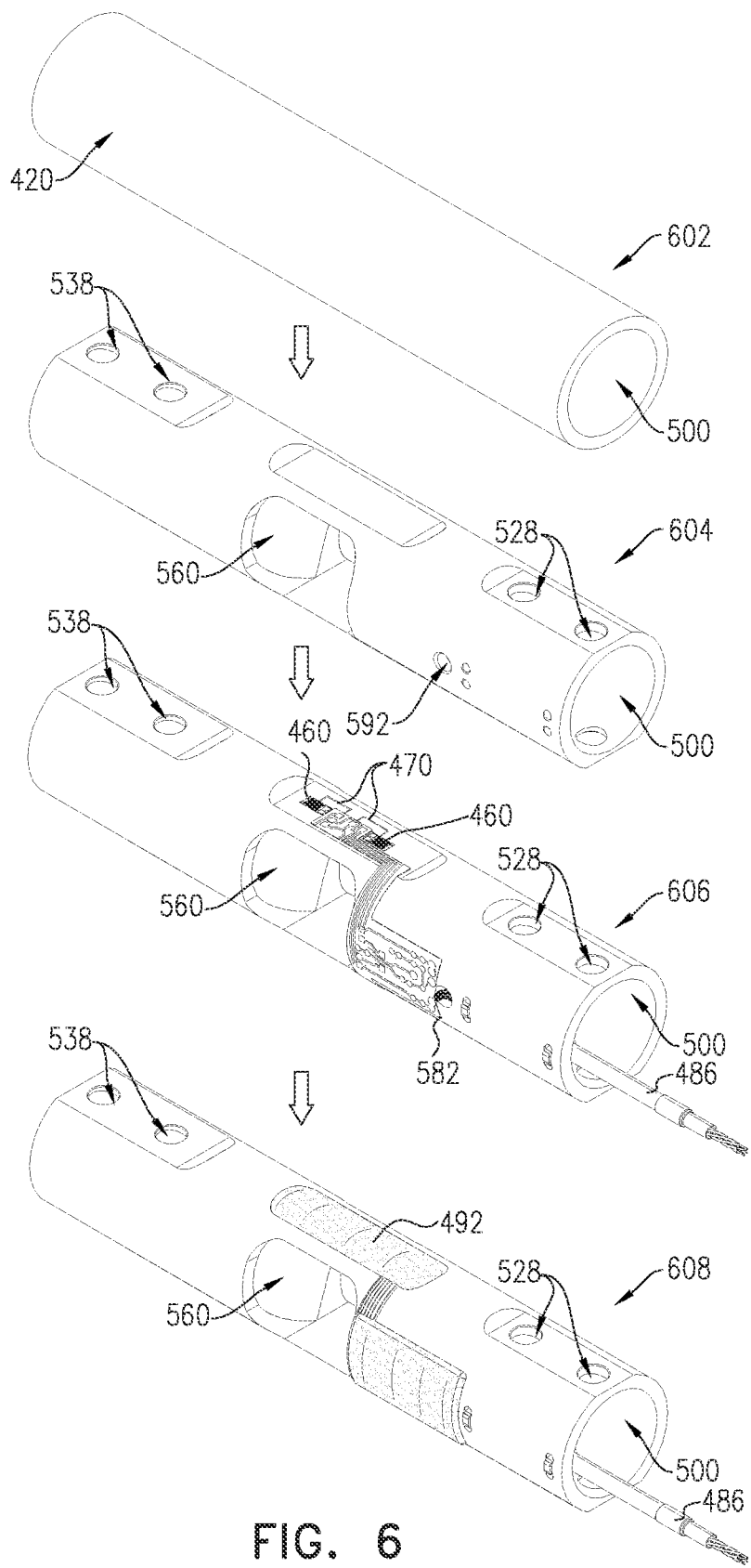
FIG. 6 is a simplified illustration of a method for manufacturing the force sensor assembly of FIGS. 4A-5C.

Reference is now made to FIG. 6, which is a simplified illustration of a method for manufacturing force sensor assembly 400 of FIGS. 4A-5C. As seen at a fabrication step 602, the method begins by fabricating elongate force responsive beam element 420. As described hereinabove with particular reference to FIGS. 5A-5C, elongate force responsive beam element 420 preferably extends along longitudinal axis 442, which is generally perpendicular to force application axis 432, and elongate force responsive beam element 420 is preferably formed with throughgoing longitudinal bore 500 along longitudinal axis 442.

As noted above, fabrication step 602 may be any suitable process, including, inter alia, an extrusion process, a drawing process, a rolling process, a tube forming process, which may be either a seamed tube forming process or a seamless tube forming process, a forging process, a three-dimensional (3D) printing process, a metal injection molding (MIM) process and a machining process.

In a preferred embodiment of the present invention, bore 500 is formed together with elongate force responsive beam element 420. For example, when using an extrusion process for fabrication step 602, a hollow extrusion profile produced at fabrication step 602 defines cylindrical wall 502 as well as bore 500 of elongate force responsive beam element 420. Thus, in such an embodiment, preferably no subtractive processes are required to form bore 500.

In contrast, in embodiments wherein fabrication step 602 is a subtractive process, bore 500 is preferably formed after an initial formation step of elongate force responsive beam element 420. For example, at fabrication step 602, a solid bar or cylinder may first be produced, which may then be machined to form bore 500 therein, thereby producing elongate force responsive beam element 420.

In one embodiment of the present invention, fabrication step 602 produces beams each having an elongate dimension which is longer than elongate dimension $L_2$. In such an embodiment, fabrication step 602 includes cutting each beam into lengths each having an elongate dimension equal to or nearly equal to $L_2$.

As seen at a detailing step 604, flattened areas and apertures in elongate force responsive beam element 420, including flattened areas 524, 526, 534, 536, 566, 568, 582 and 584, apertures 528 and 538, transverse bore 560, electrical communication aperture 592 and fastener apertures 598, are formed. In an embodiment wherein markings are formed on elongate force responsive beam element 420, the markings are also preferably formed at detailing step 604. It is appreciated that the apertures and flattened areas in elongate force responsive beam element 420, as well as any markings on elongate force responsive beam element 420, may be formed by any suitable process, including, inter alia, machining, electrical discharge machining (EDM), broaching, erosion and ablation.

As described hereinabove with reference to FIGS. 5A-5C, transverse bore 560 is preferably a throughgoing transverse bore extending along transverse axis 562, which is preferably generally perpendicular to both force application axis 432 and to longitudinal axis 442. Additionally, as described hereinabove with reference to FIGS. 5A-5C, at least one, and more preferably all of, strain gauges 460 and transverse bore 560 preferably at least partially overlie one another.

As seen at an assembly step 606, at least one strain gauge 460 is preferably affixed to elongate force responsive beam element 420. As described hereinabove with particular reference to FIGS. 4A-4D, strain gauge or gauges 460 preferably generate a strain gauge output in response to a force applied in a force application direction 430. Also at assembly step 606, strain gauge or gauges 460 are preferably connected, using ECEs 470, to circuit elements 480, which in the embodiment shown in FIGS. 4A-6, are affixed to elongate force responsive beam element 420, but need not be affixed to elongate force responsive beam element 420.

As described hereinabove with particular reference to FIGS. 4A-4D, at least some of circuit elements 480 preferably convert the strain gauge output of strain gauge or gauges 460 into a force indication, indicating a magnitude of the applied force. As described hereinabove with particular reference to FIGS. 4A-4D, strain gauge or gauges 460 and circuit elements 480 are preferably fixedly mounted to elongate force responsive beam element 420 using any suitable mounting material, most typically an adhesive, such as, inter alia, cyanoacrylate, acrylic or epoxy, or using protective cover elements 492. It is appreciated that the mounting material used to affix circuit elements 480 to elongate force responsive beam element 420 may be the same mounting material used to affix strain gauge or gauges 460 to elongate force responsive beam element 420. Alternatively, the mounting material used to affix circuit elements 480 to elongate force responsive beam element 420 may be a different mounting material than that used to affix strain gauge or gauges 460 to elongate force responsive beam element 420. Also at assembly step 606, electric cable 486 is preferably electrically connected to circuit elements 480, and electric cable 486 is preferably fixedly mounted to elongate force responsive beam element 420, preferably using cable fasteners 488.

As seen in a sealing step 608, protective cover elements 492 are preferably affixed to elongate force responsive beam element 420. It is appreciated that in an embodiment in which protective cover elements 492 affix at least one of strain gauges 460 and circuit elements 480 to elongate force responsive beam element 420, assembly step 606 and sealing step 608 are typically combined into a single step.

In another embodiment of the present invention, force sensor assembly 400 is hermetically sealed at sealing step 608, and protective cover elements 492 may be obviated. Alternatively, sealing step 608 hermetically seals force sensor assembly 400 following attachment of protective cover elements 492.

Figure 7A:
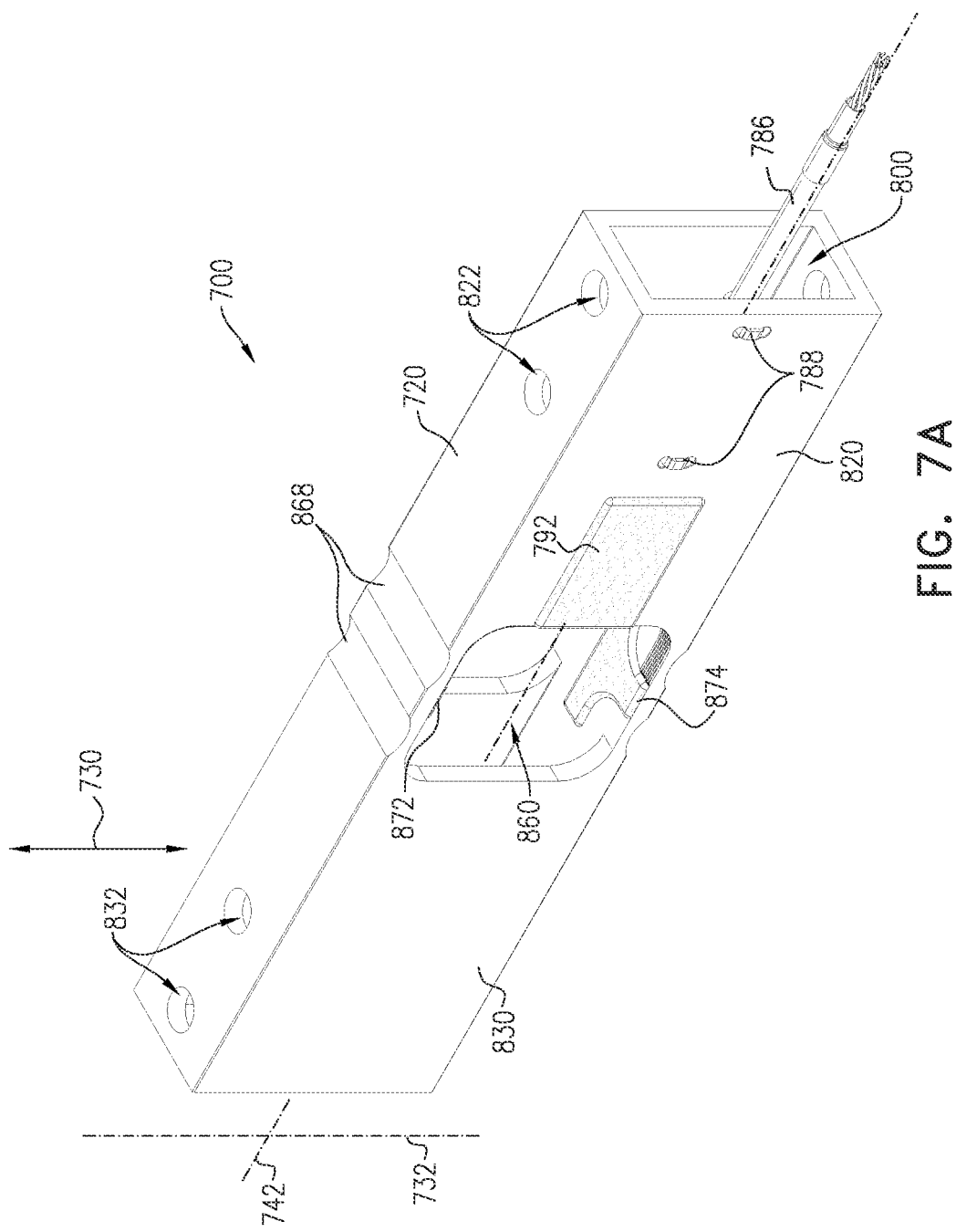
FIGS. 7A, 7B, 7C, and 7D are simplified respective assembled, top-facing partly exploded, bottom-facing partly exploded and top-facing fully exploded illustrations of an elongate force sensor assembly constructed and operative in accordance with yet another embodiment of the present invention.
Figure 7B:
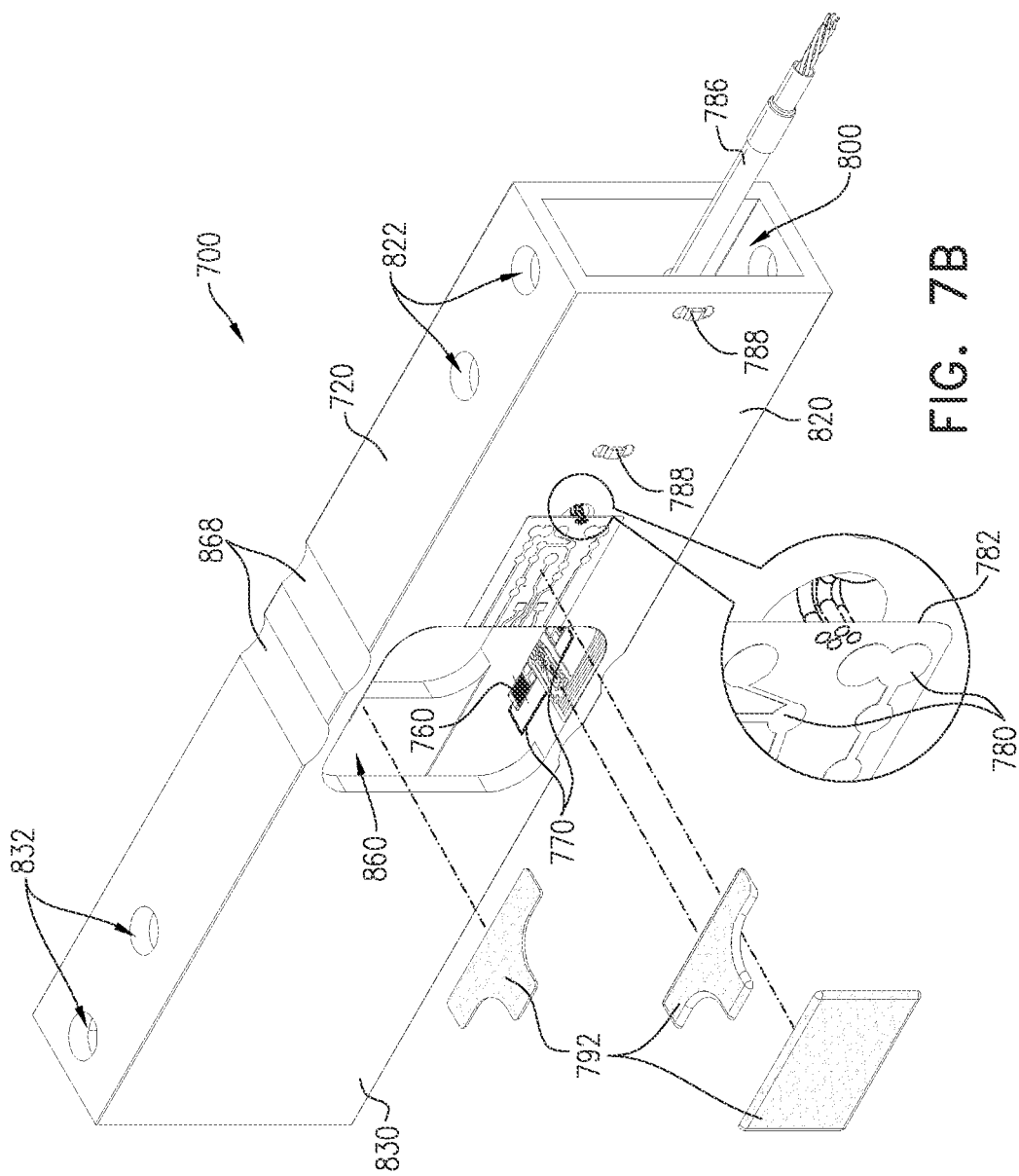
Figure 7C:
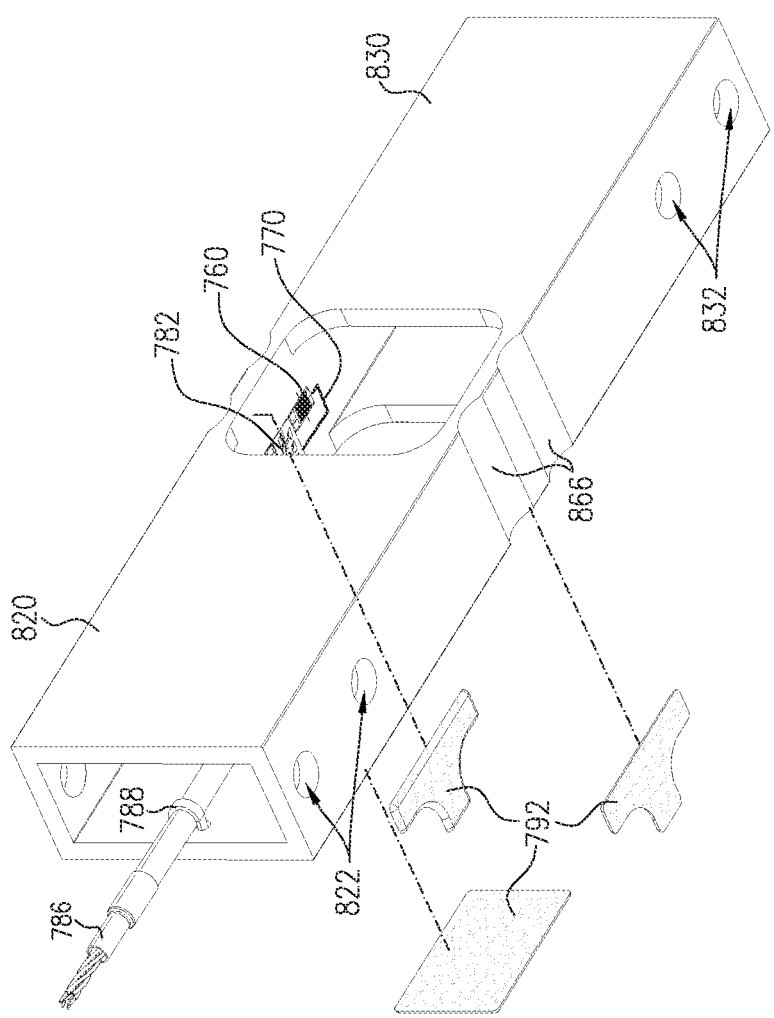
Figure 7D:
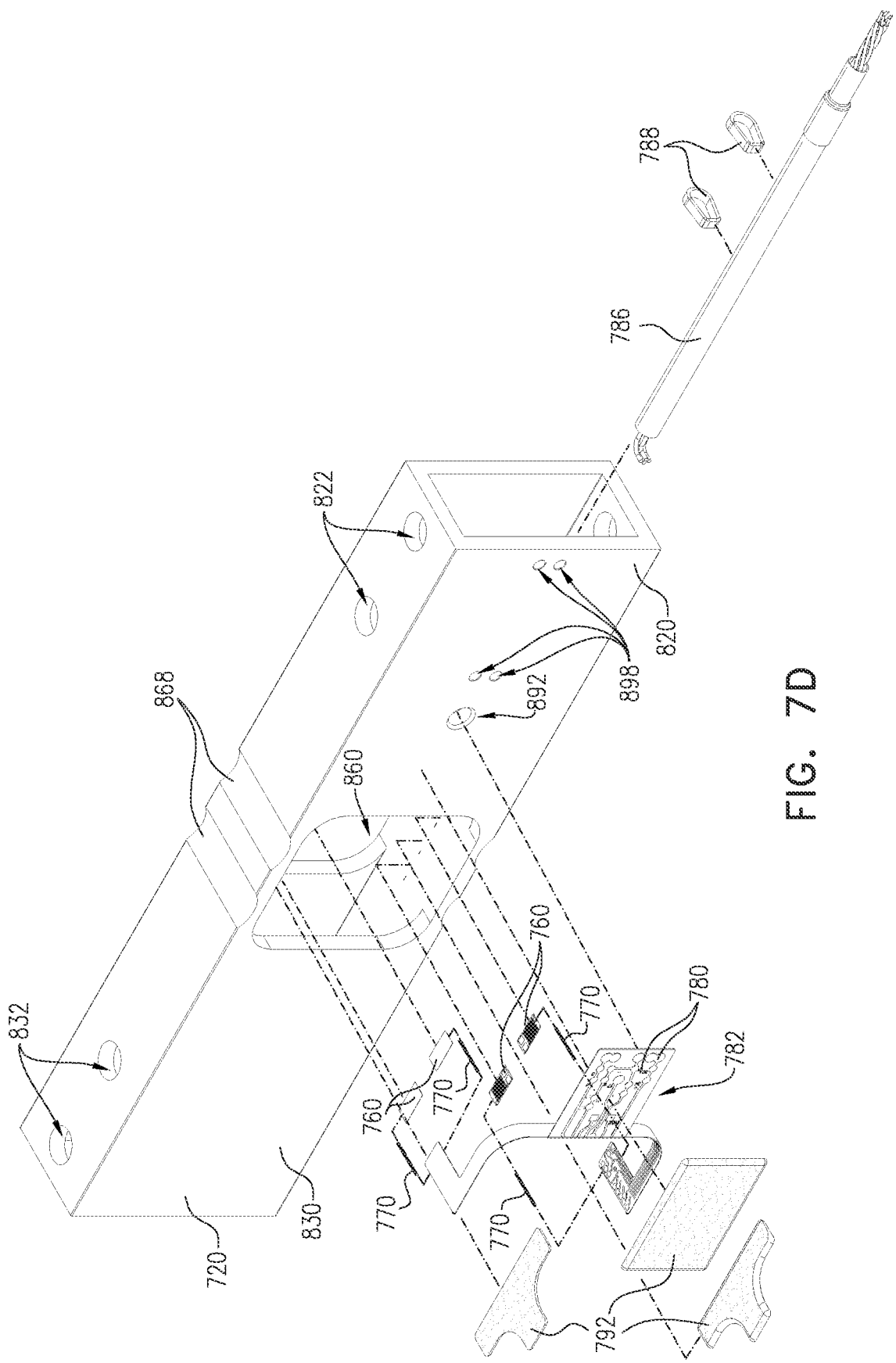
Figure 8A:
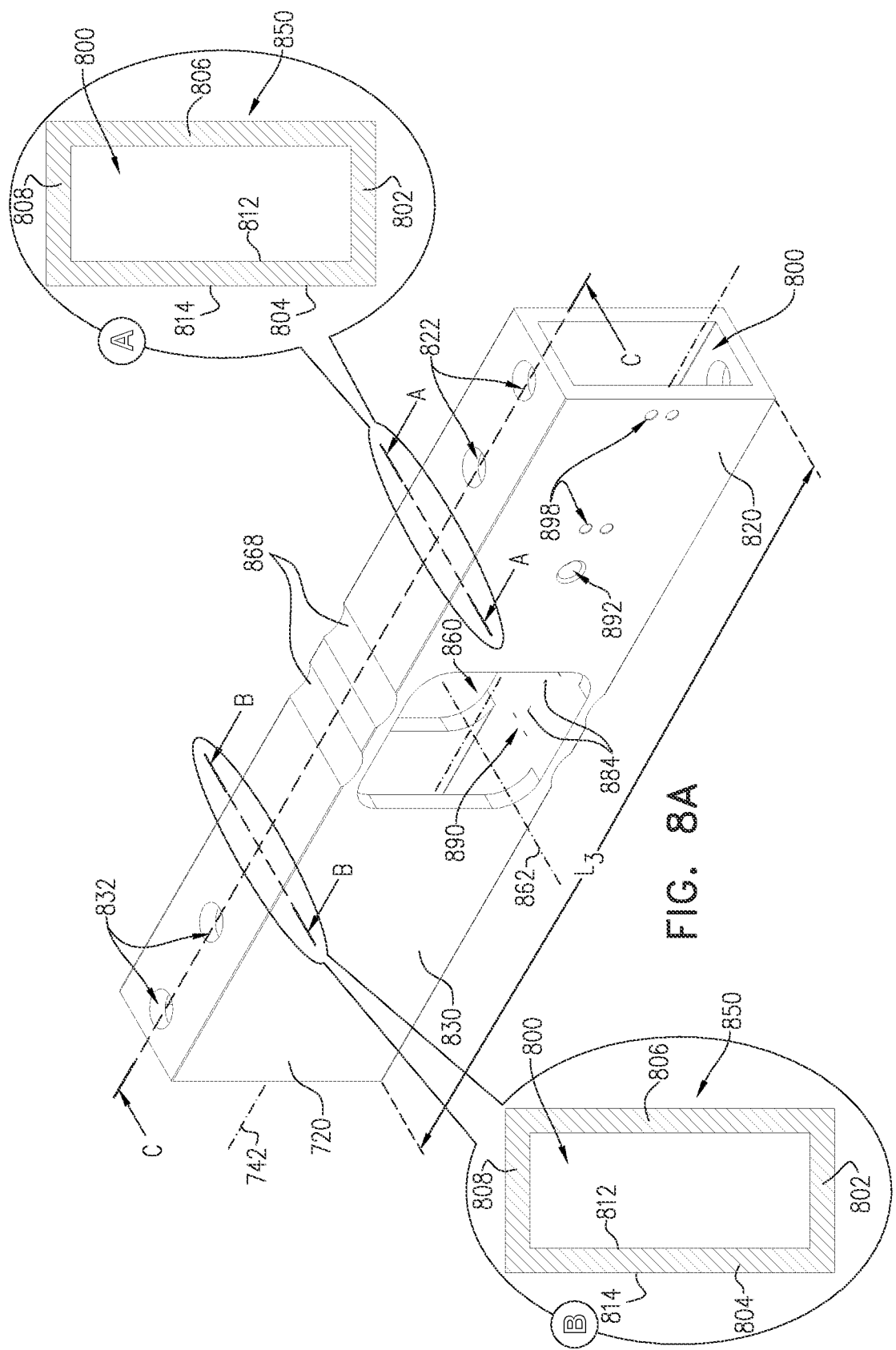
FIGS. 8A, 8B and 8C are simplified respective top-facing perspective, bottom-facing perspective and sectional illustrations of an elongate force responsive beam element of the force sensor assembly of FIGS. 7A-7D, FIG. 8C being taken along sectional line C-C in FIG. 8A.
Figure 8B:
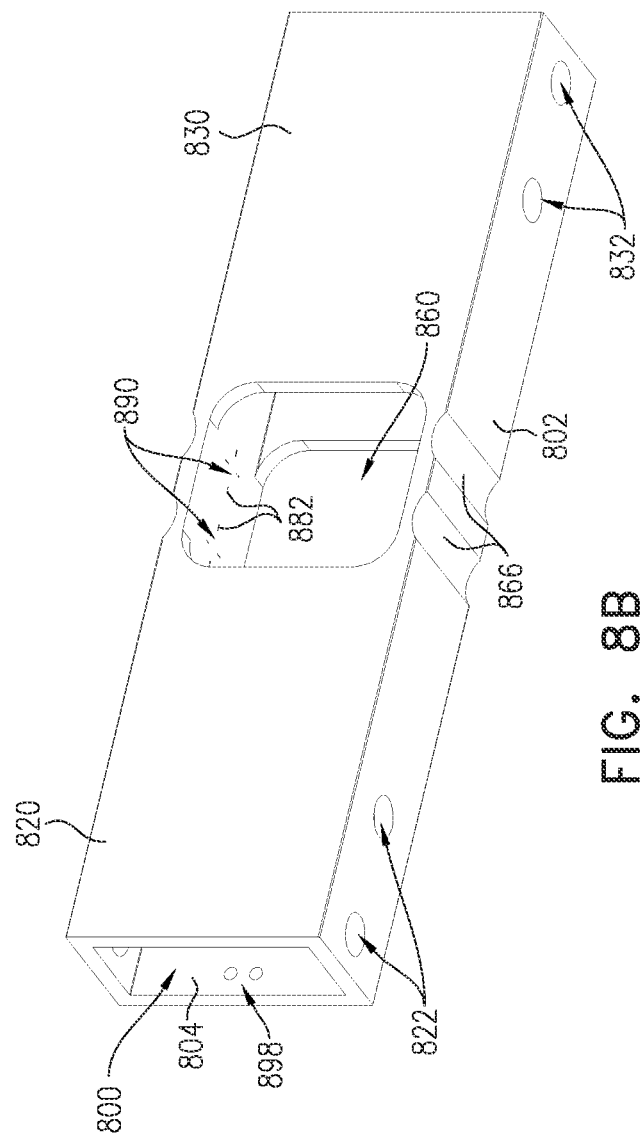
Figure 8C:
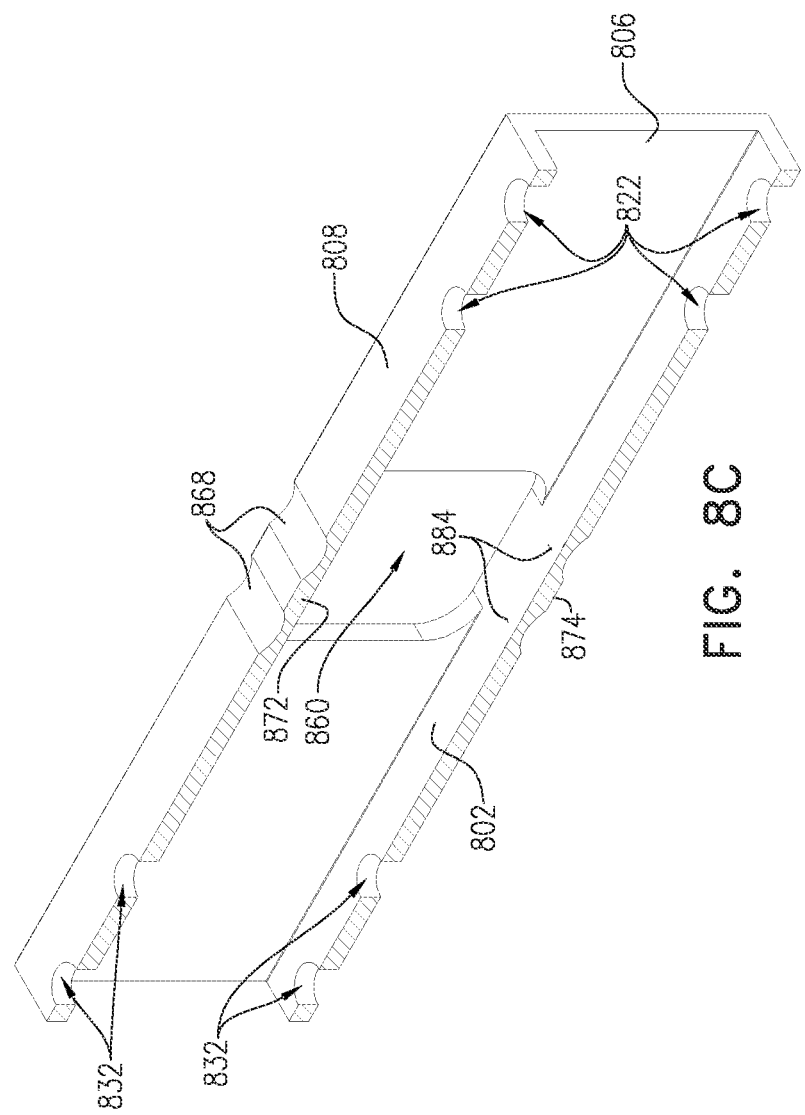

Reference is now made to FIGS. 7A-7D, which are simplified illustrations of an elongate force sensor assembly 700 constructed and operative in accordance with yet an additional embodiment of the present invention, and to FIGS. 8A-8C, which are illustrations of an elongate force responsive beam element 720 of force sensor assembly 700 of FIGS. 7A-7D. It is appreciated that force sensor assembly 700 is operative to measure a force applied in a force application direction 730 which is parallel to a force application axis 732. It is appreciated that force application axis 732 is preferably perpendicular to a longitudinal axis 742 of elongate force beam responsive element 720. In a case wherein force sensor assembly 700 measures weight, force application axis 732 is generally parallel and/or antiparallel to a direction in which a gravitational force acts.

As seen in FIGS. 7A-8C, force sensor assembly 700 includes elongate force responsive beam element 720, which preferably extends along longitudinal axis 742. In a preferred embodiment of the present invention, longitudinal axis 742 is generally perpendicular to force application axis 732. It is appreciated that elongate force responsive beam element 720 is an elastic element.

It is appreciated that, as described hereinabove, the term "elastic element" refers to an element of a transducer whose deflection in response to an applied force is sensed and converted into an output. Such an element is also referred to in the art as, inter alia, an elastic body, a spring element and a spring body. It is appreciated that elongate force responsive beam element 720 is typically not formed from an elastomer. Rather, as described hereinbelow, elongate force responsive beam element 720 is preferably made from a material, such as a suitable metal or other suitable solid material, which exhibits a linear relationship between the stress, namely an applied force, and strain, namely deformation of elongate force responsive beam element 720.

As seen particularly in FIGS. 7B-7D, force sensor assembly 700 preferably further includes at least one strain gauge 760, and more preferably a plurality of strain gauges 760, which are fixedly mounted on elongate force responsive beam element 720 and generate a strain gauge output in response to a force applied to force sensor assembly 700 in application direction 730.

In a preferred embodiment of the present invention, force sensor assembly 700 includes an even number of strain gauges 760, such as, inter alia, 2 strain gauges 760, 4 strain gauges 760, 6 strain gauges 760 or 8 strain gauges 760. Depending on the number of strain gauges 760 included in force sensor assembly 700, strain gauges 760 may be electrically connected to one another in, inter alia, a quarter-bridge configuration, a half-bridge configuration, a full bridge configuration, such as a Wheatstone bridge configuration, or a double-bridge configuration. In another embodiment of the present invention, force sensor assembly 700 includes an odd number of strain gauges 760.

In one embodiment of the present invention, strain gauges 760 may be affixed to elongate force responsive beam element 720 using any suitable mounting material, most typically an adhesive, such as, inter alia, a strain gauge bonding material, such as epoxy. In another embodiment of the present invention, strain gauges 760 may be deposited directly on elongate force responsive beam element 720, for example by vapor deposition.

Each strain gauge 760 may be embodied as any suitable strain gauge, including, inter alia, a foil strain gauge, a semiconductor strain gauge, a thin-film strain gauge, a thick-film strain gauge and a wire strain gauge. Preferably, all strain gauges 760 in force sensor assembly 700 are of the same class, and more preferably of the same model. In a preferred embodiment of the present invention, each of strain gauges 760 is embodied as a foil or wire strain gauge, such as an N2A-XX-S5105R-350/E5 strain gauge, commercially available from Vishay Precision Group, of Wendell, NC, USA.

Preferably, a plurality of electrically conductive elements (ECEs) 770, such as insulated copper conductors, electrically connect strain gauges 760 to a plurality of circuit elements 780, at least some of which are preferably included in a printed circuit board (PCB) 782, such as a flexible PCB. As described hereinabove, strain gauge or gauges 760 preferably generate a strain gauge output, more particularly, a resistance, in response to a deformation thereof, which deformation is dependent on the applied force. Preferably, at least some of circuit elements 780 convert the strain gauge output of strain gauge or gauges 760 into a force indication, indicating a magnitude of the applied force. As is well known in the art, the force indication generated by circuit elements 780 may be displayed to a user and/or used in calculations by an automated or semi-automated system. By way of example, circuit elements 780 may be embodied as a readout instrument, such as a VT300 commercially available from VPG Transducers of Ontario, CA, USA.

In a preferred embodiment of the present invention, force sensor assembly 700 further includes an electric cable 786, which electrically connects circuit elements 780 to external circuitry, including a power source (not shown). Preferably, a plurality of cable fasteners 788, such as, inter alia, cable ties, clamps or cable glands, affix electric cable 786 to elongate force responsive beam element 720, preferably to an inner surface of a wall portion thereof. In a preferred embodiment of the present invention, electric cable 786 includes multiple electrically conductive elements, for example, multiple insulated copper conductors. In the embodiment of the present invention illustrated in FIGS. 7A-7D, electric cable 786 is disposed within elongate force responsive beam element 720. In another embodiment of the present invention, electric cable 786 is disposed outside of elongate force responsive beam element 720.

In one embodiment of the present invention, PCB 782 may be affixed to elongate force responsive beam element 720 using a suitable mounting material, typically an adhesive, such as, inter alia, cyanoacrylate or acrylic, or using at least one protective cover element 792. In another embodiment of the present invention, PCB 782 is mounted on a support other than elongate force responsive beam element 720, for example, on a support (not shown) to which elongate force responsive beam element 720 is mounted.

In the embodiment of the present invention shown in FIGS. 7A-7D, force sensor assembly 700 includes protective cover elements 792 to protect and insulate strain gauges 760 and at least some of, and more preferably all of, circuit elements 780. It is appreciated that strain gauges 760 and circuit elements 780 which are protected by protective cover elements 792 are disposed between elongate force responsive beam element 720 and one of protective cover elements 792.

Protective cover elements 792 may be formed of any suitable material, such as, inter alia, room-temperature-vulcanizing (RTV) silicone, vulcanized rubber or polyurethane, and are preferably affixed to elongate force responsive beam element 720. In one embodiment of the present invention, protective cover elements 792 also serve to affix at least one of strain gauges 760 and circuit elements 780 to elongate force responsive beam element 720. In another embodiment of the present invention, force sensor assembly 700 may be hermetically sealed, over protective cover elements 792. Alternatively, protective cover elements 792 may be obviated when force sensor assembly 700 is hermetically sealed.

Turning now particularly to FIGS. 8A-8C, it is seen that elongate force responsive beam element 720 is formed with a throughgoing longitudinal bore 800 along longitudinal axis 742. Thus, elongate force responsive beam element 720 is hollow along longitudinal axis 742.

Longitudinal bore 800 is preferably generally enclosed by a generally planar rectangular bottom wall portion 802 of elongate force responsive beam element 720, a first generally planar rectangular side wall portion 804 of elongate force responsive beam element 720, a second generally planar rectangular side wall portion 806 of elongate force responsive beam element 720 and a generally planar rectangular top wall portion 808 of elongate force responsive beam element 720. It is appreciated that elongate force responsive beam element 720 is formed with an inner surface 812 and an outer surface 814, both of which preferably extend along all of wall portions 802, 804, 806 and 808.

Elongate force responsive beam element 720 is preferably characterized by an elongate dimension $L_3$ along longitudinal axis 742. In a preferred embodiment of the present invention, as seen in FIGS. 7A-8C, throughgoing longitudinal bore 800 extends along the entirety of elongate dimension $L_3$.

In a preferred embodiment of the present invention, as seen particularly in FIGS. 7A-7D, throughgoing longitudinal bore 800 may fully or partially house one or more elements of force sensor assembly 700, such as electric cable 786.

Preferably, elongate force responsive beam element 720 includes a mounting end 820, for fixedly mounting force sensor assembly 700 to a support (not shown). In the embodiment of the present invention shown in FIGS. 7A-8C, mounting end 820 includes, preferably formed in bottom and top wall portions 802 and 808, a plurality of mounting apertures 822 to receive mounting fasteners (not shown) for affixing elongate force responsive beam element 720 to the support. In another embodiment of the present invention, mounting apertures 822 may be obviated, and elongate force responsive beam element 720 is fixed to the support without using apertures, for example, by clamping mounting end 820 of elongate force responsive beam element 720 to the support.

Elongate force responsive beam element 720 further includes a loading end 830, being generally opposite mounting end 820 along longitudinal axis 742. In the embodiment of the present invention shown in FIGS. 7A-8C, loading end 830 includes, preferably formed in bottom and top wall portions 802 and 808, a plurality of fastener apertures 832 to receive platform fasteners (not shown) for affixing a loading platform (not shown), such as a weighing platform, to elongate force responsive beam element 720. In another embodiment of the present invention, apertures 832 may be obviated, and either no loading platform is used with force sensor assembly 700 or the loading platform is fastened to elongate force responsive beam element 720 without using apertures, for example, by clamping the loading platform to loading end 830 of elongate force responsive beam element 720.

Whether or not a loading platform is used in conjunction with force sensor assembly 700, force sensor assembly 700 is typically used by applying an applied force to loading end 830 of elongate force responsive beam element 720. Since loading end 830 is free to deflect in direction 730 and mounting end 820 is fixed, an applied force in direction 730 exerted upon loading end 830 causes a deformation of elongate force responsive beam element 720. Particularly, the deformation of elongate force responsive beam element 720 is typically characterized by an increase in a magnitude of elongate dimension $L_3$. As used herein, an undeformed state of elongate force responsive beam element 720 refers to a configuration of elongate force responsive beam element 720 when force sensor assembly 700 is not subject to an applied force other than those forces which always act on force sensor assembly 700, such as Earth's gravitational force.

As seen particularly in sectional enlargements A and B of FIG. 8A, which are taken along respective lines A-A and B-B of FIG. 8A, a cross-section 850 of elongate force responsive beam element 720 generally perpendicular to longitudinal axis 742 is hollow. It is appreciated that cross-section 850 is preferably hollow at both mounting end 820 and loading end 830 of elongate force responsive beam element 720.

In the embodiment shown in FIGS. 7A-8C, cross-section 850 is generally symmetric, and more particularly is generally rectangular. In another embodiment of the present invention, cross-section 850 may be any suitable shape, including, inter alia, square, circular, elliptic, triangular, hexagonal, and star-shaped, and the shape of cross-section 850 may be symmetric or non-symmetric. In one embodiment of the present invention, cross-section 850 is generally uniform at both mounting end 820 and loading end 830 of elongate force responsive beam element 720. In another embodiment of the present invention, cross-section 850 is not uniform at both mounting end 820 and loading end 830 of elongate force responsive beam element 720; for example, cross-section 850 may include additional, preferably threaded, material surrounding one or more of apertures 822 and 832.

It is appreciated that a shape and size of cross-section 850 is determined both by inner surface 812 and outer surface 814 of elongate force responsive beam element 720. In the embodiment illustrated in FIGS. 7A-8C, the shape of inner surface 812 at cross-section 850 is the same general shape as the shape of outer surface 814 at cross-section 850. In another embodiment of the present invention, the shape of inner surface 812 at cross-section 850 is different than the shape of outer surface 814 at cross-section 850.

In the embodiment shown in FIGS. 7A-8C, in addition to throughgoing longitudinal bore 800, elongate force responsive beam element 720 is also formed with a transverse bore 860 along a transverse axis 862. As seen particularly in FIG. 8A, transverse axis 862 is generally perpendicular to both force application axis 732 and to longitudinal axis 742. In a preferred embodiment of the present invention, at least one of strain gauges 760 and transverse bore 860 at least partially overlie one another, and more preferably all of strain gauges 760 and transverse bore 860 at least partially overlie one another. In the illustrated embodiment of the present invention, transverse bore 860 is a throughgoing bore which fully pierces both first and second side wall portions 804 and 806 of elongate force responsive beam element 720.

In the embodiment shown in FIGS. 7A-8C, in addition to transverse bore 860, elongate force responsive beam element 720 is formed with a plurality of bottom recesses 866 in outer surface 814 of bottom wall portion 802 of elongate force responsive beam element 720. Similarly, in the embodiment shown in FIGS. 7A-8C, elongate force responsive beam element 720 is preferably additionally formed with a plurality of top recesses 868 in outer surface 814 of top wall portion 808 of elongate force responsive beam element 720. In another embodiment of the present invention, some or all of recesses 866 and 868 may be obviated.

It is appreciated that transverse bore 860 and recesses 866 and 868 preferably together act as a binocular strain engine and, together with elongate force responsive beam element 720, define an upper beam 872 and a lower beam 874. Thus, force sensor assembly 700 is preferably a multi-beam force sensor, and in a preferred embodiment of the present invention, is a single-point force sensor, such as a single-point load cell.

In the embodiment illustrated in FIGS. 7A-8C, upper beam 872 is formed with markings 882, which are preferably formed on inner surface 812 of top wall portion 808 of elongate force responsive beam element 720. Similarly, in the embodiment illustrated in FIGS. 7A-8C, lower beam 874 is formed with markings 884, which are preferably formed on inner surface 812 of bottom wall portion 802 of elongate force responsive beam element 720. In another embodiment of the present invention, some or all of markings 882 and 884 may be obviated.

Markings 882 and 884 preferably indicate a plurality of strain positions 890 to which strain gauges 760 are to be affixed. In the embodiment shown in FIGS. 7A-8C, each of strain positions 890 is aligned with one of recesses 866 and 868, and the geometry of transverse bore 860 results in strains of generally equal magnitude being present at each of strain positions 890 as a result of the applied force.

It is appreciated that in a preferred embodiment of the present invention, transverse bore 860 and recesses 866 and 868 are shaped to compensate for eccentricity, such that force sensor assembly 700 provides a force indication output that is uniform within a predetermined tolerance for off-center loading, wherein the applied force is incident anywhere within a predetermined locus of loading end 830.

In a preferred embodiment of the present invention, elongate force responsive beam element 720 is further formed with an electrical communication aperture 892, preferably in side wall portion 804, to allow electrical communication between electric cable 786 and PCB 782. Elongate force responsive beam element 720 is preferably further formed with a plurality of fastener apertures 898, preferably in side wall portion 804, which are operative to receive cable fasteners 788 for the affixation of electric cable 786 to elongate force responsive beam element 720.

In one embodiment of the present invention, elongate force responsive beam element 720 is formed of a metal, such as an aluminum alloy or a steel alloy. In another embodiment of the present invention, elongate force responsive beam element 720 is formed of a composite material, which may be either a metal matrix composite material or a non-metal matrix composite material, such as, inter alia, a carbon composite or fiberglass.

As described hereinbelow with reference to FIG. 9, elongate force responsive beam element 720 may be formed by any suitable process, including, inter alia, an extrusion process, a drawing process, a rolling process, a tube forming process, which may be either a seamed tube forming process or a seamless tube forming process, a forging process, a three-dimensional (3D) printing process, a metal injection molding (MIM) process and a machining process.

Similarly, each of transverse bore 860, apertures 822, 832, 892 and 898, and recesses 866 and 868 may be formed by any suitable process, including, inter alia, machining, electrical discharge machining (EDM), broaching, erosion and ablation.

Figure 9:
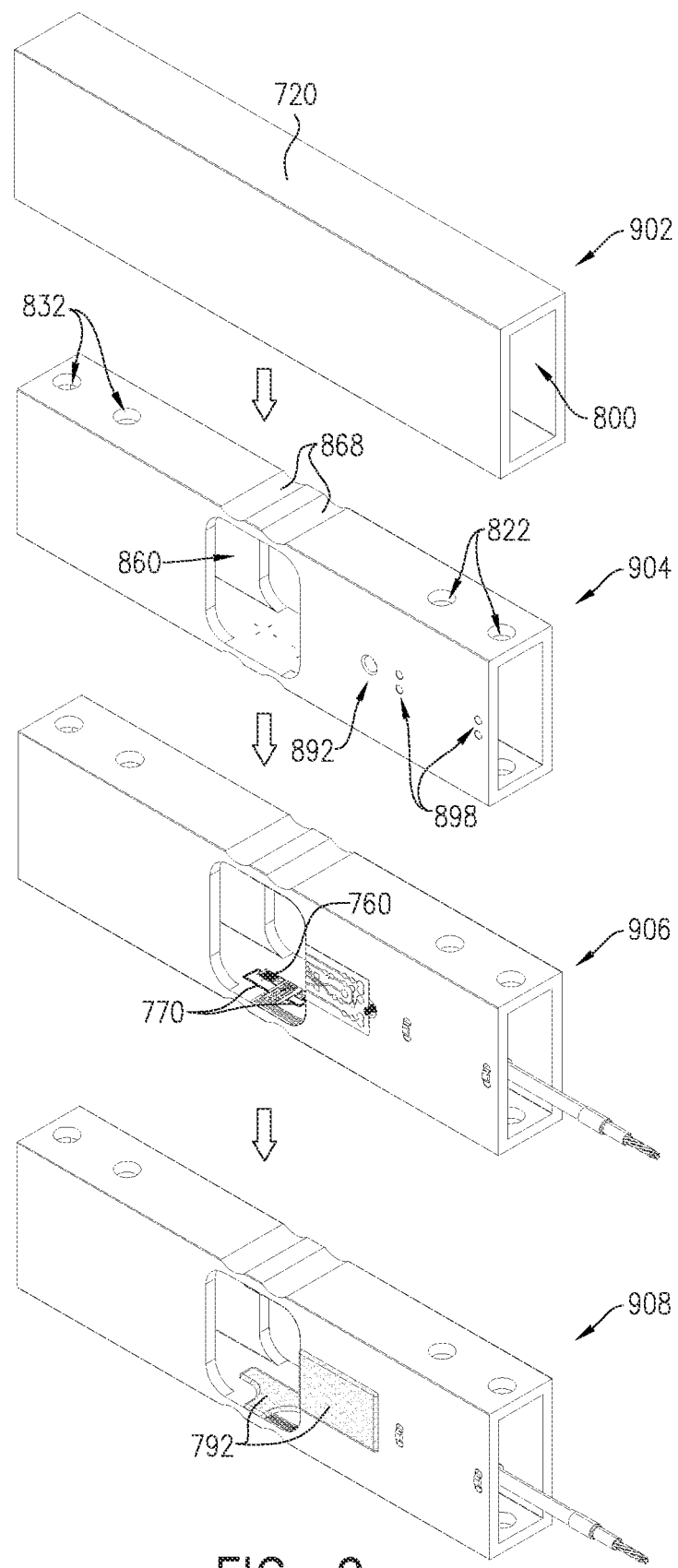
FIG. 9 is a simplified illustration of a method for manufacturing the force sensor assembly of FIGS. 7A-8C.

Reference is now made to FIG. 9, which is a simplified illustration of a method for manufacturing force sensor assembly 700 of FIGS. 7A-8C. As seen at a fabrication step 902, the method begins by fabricating elongate force responsive beam element 720. As described hereinabove with particular reference to FIGS. 8A-8C, elongate force responsive beam element 720 preferably extends along longitudinal axis 742, which is generally perpendicular to force application axis 732, and elongate force responsive beam element 720 is preferably formed with throughgoing longitudinal bore 800 along longitudinal axis 742.

As noted above, fabrication step 902 may be any suitable process, including, inter alia, an extrusion process, a drawing process, a rolling process, a tube forming process, which may be either a seamed tube forming process or a seamless tube forming process, a forging process, a three-dimensional (3D) printing process, a metal injection molding (MIM) process and a machining process.

In a preferred embodiment of the present invention, bore 800 is formed together with elongate force responsive beam element 720. For example, when using an extrusion process for fabrication step 902, a hollow extrusion profile produced at fabrication step 902 defines all of wall portions 802, 804, 806 and 808 as well as bore 800 of elongate force responsive beam element 720. Thus, in such an embodiment, preferably no subtractive processes are required to form bore 800.

In contrast, in embodiments wherein fabrication step 902 is a subtractive process, bore 800 is preferably formed after an initial formation step of elongate force responsive beam element 720. For example, at fabrication step 902, a solid bar may first be produced, which may then be machined to form bore 800 therein, thereby producing elongate force responsive beam element 720.

In one embodiment of the present invention, fabrication step 902 produces beams each having an elongate dimension which is longer than elongate dimension $L_3$. In such an embodiment, fabrication step 902 includes cutting each beam into lengths each having an elongate dimension equal to or nearly equal to $L_3$.

As seen at a detailing step 904, apertures and recesses in elongate force responsive beam element 720, including apertures 822, 832, 892 and 898, transverse bore 860 and recesses 866 and 868 are formed. In an embodiment wherein markings, such as markings 882 and 884, are formed on elongate force responsive beam element 720, the markings are also preferably formed at detailing step 904. It is appreciated that the apertures and recesses in elongate force responsive beam element 720, as well as any markings on elongate force responsive beam element 720, may be formed by any suitable process, including, inter alia, machining, electrical discharge machining (EDM), broaching, erosion and ablation.

As described hereinabove with reference to FIGS. 8A-8C, transverse bore 860 is preferably a throughgoing transverse bore extending along transverse axis 862, which is preferably generally perpendicular to both force application axis 732 and to longitudinal axis 742. Additionally, as described hereinabove with reference to FIGS. 8A-8C, at least one, and more preferably all of, strain gauges 760 and transverse bore 860 preferably at least partially overlie one another.

As seen at an assembly step 906, at least one strain gauge 760 is preferably affixed to elongate force responsive beam element 720. As described hereinabove with particular reference to FIGS. 7A-7D, strain gauge or gauges 760 preferably generate a strain gauge output in response to a force applied in a force application direction 730. Also at assembly step 906, strain gauge or gauges 760 are preferably connected, using ECEs 770, to circuit elements 780, which in the embodiment shown in FIGS. 7A-9, are affixed to elongate force responsive beam element 720, but need not be affixed to elongate force responsive beam element 720.

As described hereinabove with particular reference to FIGS. 7A-7D, at least some of circuit elements 780 preferably convert the strain gauge output of strain gauge or gauges 760 into a force indication, indicating a magnitude of the applied force. As described hereinabove with particular reference to FIGS. 7A-7D, strain gauge or gauges 760 and circuit elements 780 are preferably fixedly mounted to elongate force responsive beam element 720 using any suitable mounting material, most typically an adhesive, such as, inter alia, cyanoacrylate, acrylic or epoxy, or using protective cover elements 792. It is appreciated that the mounting material used to affix circuit elements 780 to elongate force responsive beam element 720 may be the same mounting material used to affix strain gauge or gauges 760 to elongate force responsive beam element 720. Alternatively, the mounting material used to affix circuit elements 780 to elongate force responsive beam element 720 may be a different mounting material than that used to affix strain gauge or gauges 760 to elongate force responsive beam element 720. Also at assembly step 906, electric cable 786 is preferably electrically connected to circuit elements 780, and electric cable 786 is preferably fixedly mounted to elongate force responsive beam element 720, preferably using cable fasteners 788.

As seen in a sealing step 908, protective cover elements 792 are preferably affixed to elongate force responsive beam element 720. It is appreciated that in an embodiment in which protective cover elements 792 affix at least one of strain gauges 760 and circuit elements 780 to elongate force responsive beam element 720, assembly step 906 and sealing step 908 are typically combined into a single step.

In another embodiment of the present invention, force sensor assembly 700 is hermetically sealed at sealing step 908, and protective cover elements 792 may be obviated. Alternatively, sealing step 908 hermetically seals force sensor assembly 700 following attachment of protective cover elements 792.

Reference is now made to FIGS. 10A-10D, which are simplified illustrations of an elongate force sensor assembly 1000 constructed and operative in accordance with still an additional embodiment of the present invention, and to FIGS. 11A-11D, which are illustrations of an elongate force responsive beam element 1020 of force sensor assembly 1000 of FIGS. 10A-10D. It is appreciated that force sensor assembly 1000 is operative to measure a force applied in a force application direction 1030 which is parallel to a force application axis 1032. It is appreciated that force application axis 1032 is preferably perpendicular to a longitudinal axis 1042 of elongate force beam responsive element 1020. In a case wherein force sensor assembly 1000 measures weight, force application axis 1032 is generally parallel and/or antiparallel to a direction in which a gravitational force acts. It is further appreciated that elongate force sensor assembly 1000 is preferably a shear force sensor.

As seen in FIGS. 10A-11D, force sensor assembly 1000 includes elongate force responsive beam element 1020, which preferably extends along longitudinal axis 1042. In a preferred embodiment of the present invention, longitudinal axis 1042 is generally perpendicular to force application axis 1032. It is appreciated that elongate force responsive beam element 1020 is an elastic element.

It is appreciated that, as described hereinabove, the term "elastic element" refers to an element of a transducer whose deflection in response to an applied force is sensed and converted into an output. Such an element is also referred to in the art as, inter alia, an elastic body, a spring element and a spring body. It is appreciated that elongate force responsive beam element 1020 is typically not formed from an elastomer. Rather, as described hereinbelow, elongate force responsive beam element 1020 is preferably made from a material, such as a suitable metal or other suitable solid material, which exhibits a linear relationship between the stress, namely an applied force, and strain, namely deformation of elongate force responsive beam element 1020.

Figure 10B:
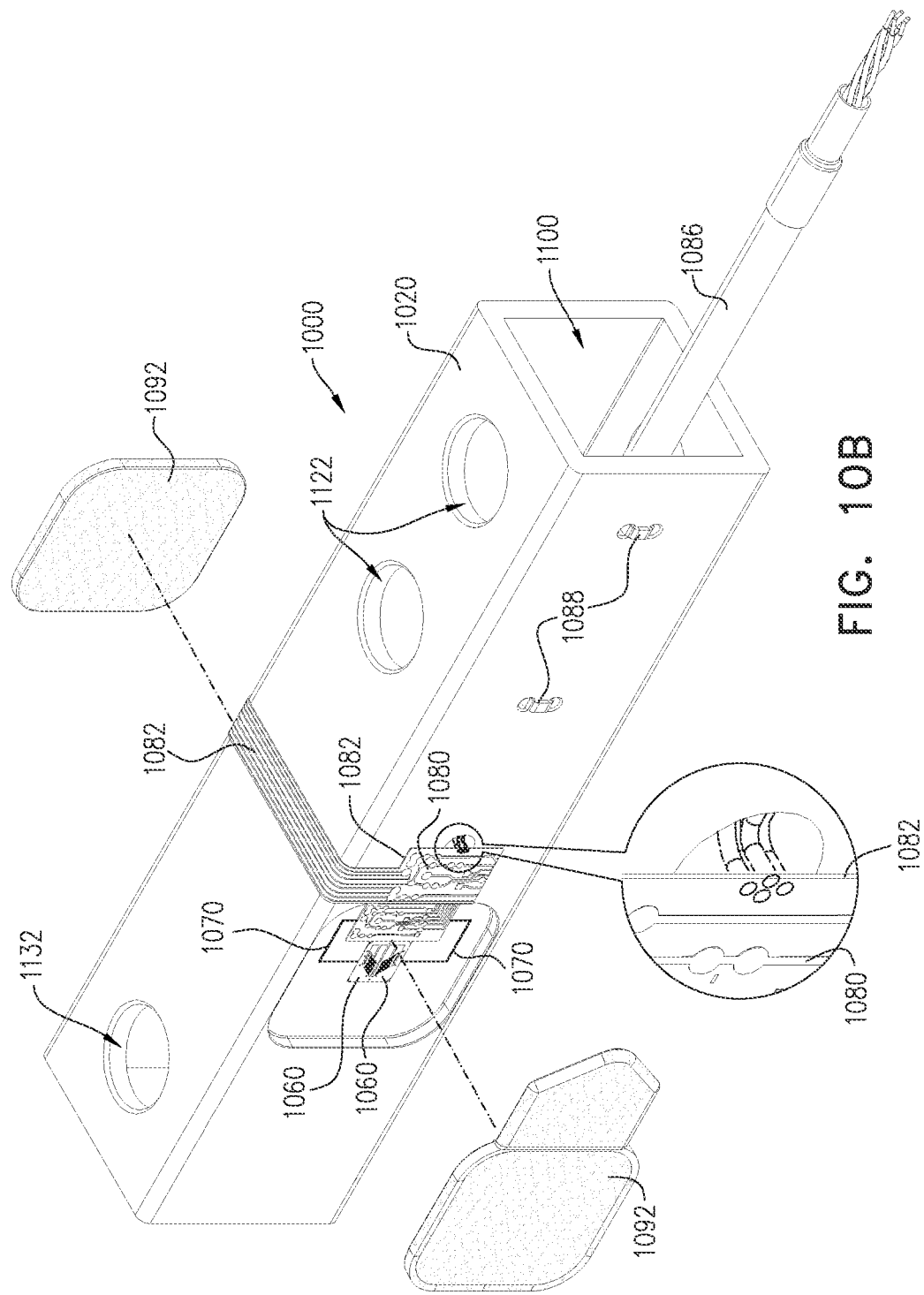
Figure 10C:
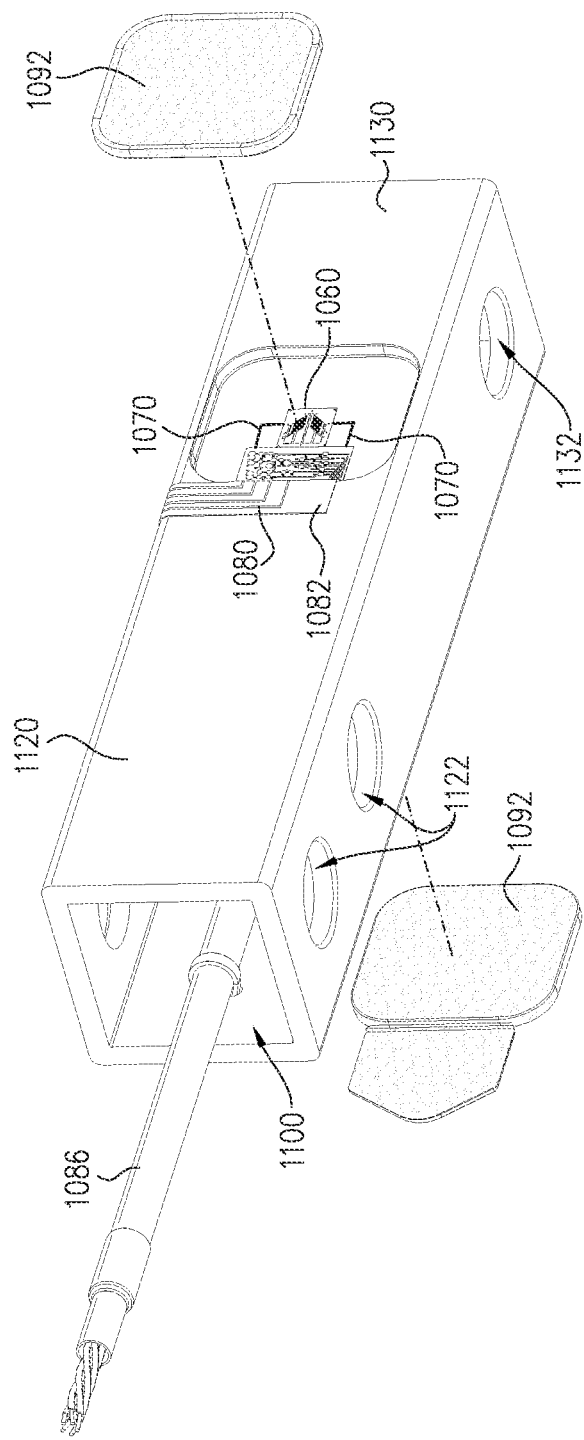
Figure 10D:
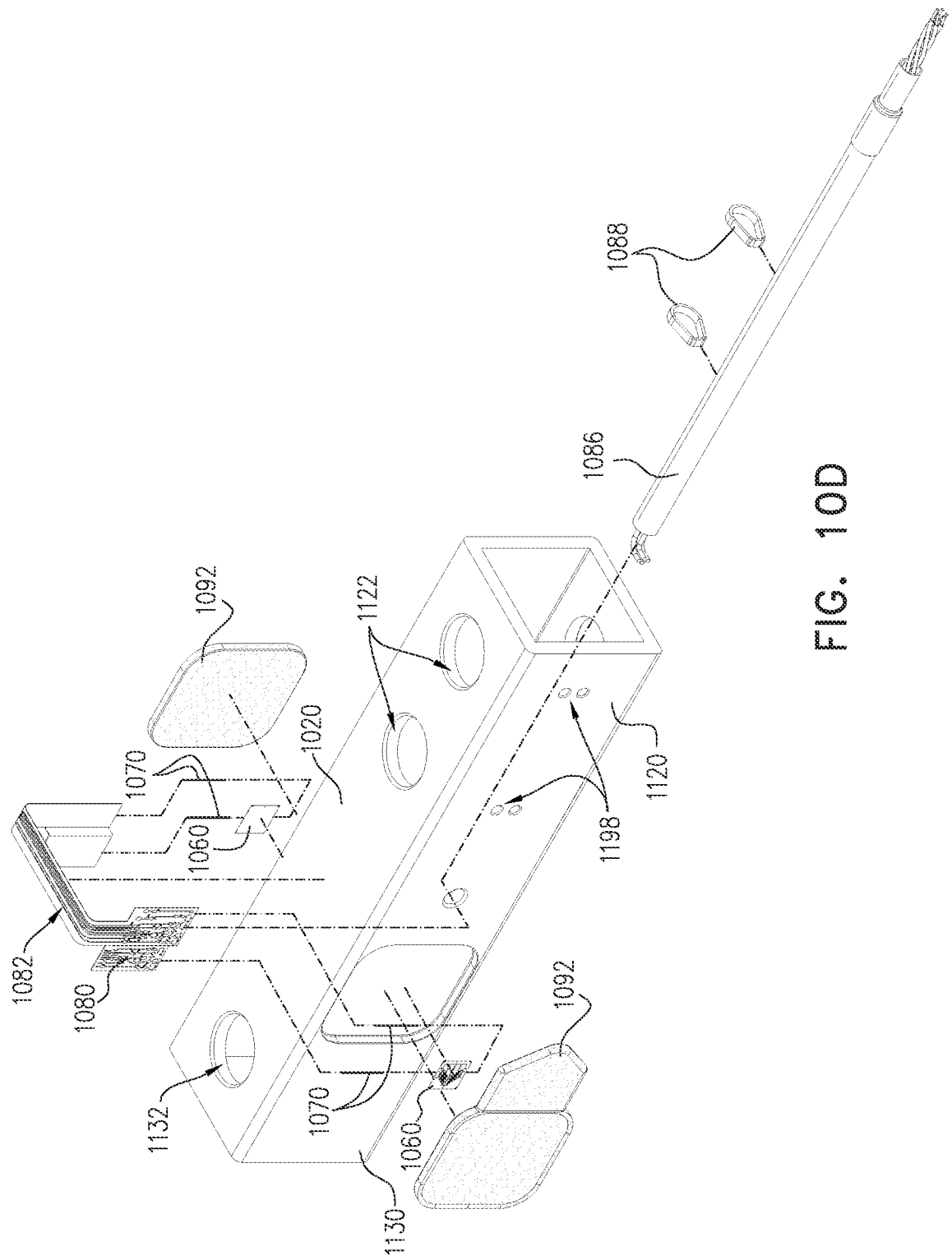

As seen particularly in FIGS. 10B-10D, force sensor assembly 1000 preferably further includes at least one strain gauge 1060, and more preferably a plurality of strain gauges 1060, which are fixedly mounted on elongate force responsive beam element 1020 and generate a strain gauge output in response to a force applied to force sensor assembly 1000 in application direction 1030.

In a preferred embodiment of the present invention, force sensor assembly 1000 includes an even number of strain gauges 1060, such as, inter alia, 2 strain gauges 1060, 4 strain gauges 1060, 6 strain gauges 1060 or 8 strain gauges 1060. Depending on the number of strain gauges 1060 included in force sensor assembly 1000, strain gauges 1060 may be electrically connected to one another in, inter alia, a quarter-bridge configuration, a half-bridge configuration, a full bridge configuration, such as a Wheatstone bridge configuration, or a double-bridge configuration. In another embodiment of the present invention, for example if force sensor assembly 1000 includes a quarter-bridge configuration, force sensor assembly 1000 includes an odd number of strain gauges 1060.

In one embodiment of the present invention, strain gauges 1060 may be affixed to elongate force responsive beam element 1020 using any suitable mounting material, most typically an adhesive, such as, inter alia, a strain gauge bonding material, such as epoxy. In another embodiment of the present invention, strain gauges 1060 may be deposited directly on elongate force responsive beam element 1020 for example by vapor deposition.

Each strain gauge 1060 may be embodied as any suitable strain gauge, including, inter alia, a foil strain gauge, a semiconductor strain gauge, a thin-film strain gauge, a thick-film strain gauge and a wire strain gauge. Preferably, all strain gauges 1060 in force sensor assembly 1000 are of the same class, and more preferably of the same model. In a preferred embodiment of the present invention, each of strain gauges 1060 is embodied as a foil or wire strain gauge rosette, where each rosette includes multiple strain gauges, such as N2A-XX-S5095R-350/E5 strain gauges, commercially available from Vishay Precision Group, of Wendell, NC, USA.

Preferably, a plurality of electrically conductive elements (ECEs) 1070, such as insulated copper conductors, electrically connect strain gauges 1060 to a plurality of circuit elements 1080, at least some of which are preferably included in a printed circuit board (PCB) 1082, such as a flexible PCB. As described hereinabove, strain gauge or gauges 1060 preferably generate a strain gauge output, more particularly, a resistance, in response to a deformation thereof, which deformation is dependent on the applied force. Preferably, at least some of circuit elements 1080 convert the strain gauge output of strain gauge or gauges 1060 into a force indication, indicating a magnitude of the applied force. As is well known in the art, the force indication generated by circuit elements 1080 may be displayed to a user and/or used in calculations by an automated or semi-automated system. By way of example, circuit elements 1080 may be embodied as a readout instrument, such as a VT300 commercially available from VPG Transducers of Ontario, CA, USA.

In a preferred embodiment of the present invention, force sensor assembly 1000 further includes an electric cable 1086, which electrically connects circuit elements 1080 to external circuitry, including a power source (not shown). Preferably, a plurality of cable fasteners 1088, such as, inter alia, cable ties, clamps or cable glands, affix electric cable 1086 to elongate force responsive beam element 1020, preferably to an inner surface of a wall portion thereof. In a preferred embodiment of the present invention, electric cable 1086 includes multiple electrically conductive elements, for example, a plurality of insulated copper conductors. In the embodiment of the present invention illustrated in FIGS. 10A-10D, electric cable 1086 is disposed within elongate force responsive beam element 1020. In another embodiment of the present invention, electric cable 1086 is disposed outside of elongate force responsive beam element 1020.

In one embodiment of the present invention, PCB 1082 may be affixed to elongate force responsive beam element 1020 using a suitable mounting material, typically an adhesive, such as, inter alia, cyanoacrylate or acrylic, or using at least one protective cover element 1092. In another embodiment of the present invention, PCB 1082 is mounted on a support other than elongate force responsive beam element 1020, for example, on a support (not shown) to which elongate force responsive beam element 1020 of force sensor assembly 1000 is mounted.

In the embodiment of the present invention shown in FIGS. 10A-11D, force sensor assembly 1000 includes protective cover elements 1092 to protect and insulate strain gauges 1060 and at least some of, and more preferably all of, circuit elements 1080. It is appreciated that strain gauges 1060 and circuit elements 1080 which are protected by protective cover elements 1092 are disposed between elongate force responsive beam element 1020 and one of protective cover elements 1092.

Protective cover elements 1092 may be formed of any suitable material, such as, inter alia, room-temperature-vulcanizing (RTV) silicone, vulcanized rubber or polyurethane, and are preferably affixed to elongate force responsive beam element 1020. In one embodiment of the present invention, protective cover elements 1092 also serve to affix at least one of strain gauges 1060 and circuit elements 1080 to elongate force responsive beam element 1020. In another embodiment of the present invention, force sensor assembly 1000 may be hermetically sealed, over protective cover elements 1092. Alternatively, protective cover elements 1092 may be obviated when force sensor assembly 1000 is hermetically sealed.

Turning now particularly to FIGS. 11A-11D, it is seen that elongate force responsive beam element 1020 is formed with a throughgoing longitudinal bore 1100 along longitudinal axis 1042. Thus, elongate force responsive beam element 1020 is hollow along longitudinal axis 1042.

Longitudinal bore 1100 is preferably generally enclosed by a generally planar rectangular bottom wall portion 1102 of elongate force responsive beam element 1020, a first generally planar rectangular side wall portion 1104 of elongate force responsive beam element 1020, a second generally planar rectangular side wall portion 1106 of elongate force responsive beam element 1020 and a generally planar rectangular top wall portion 1108 of elongate force responsive beam element 1020. It is appreciated that elongate force responsive beam element 1020 is formed with an inner surface 1112 and an outer surface 1114, both of which preferably extend along all of wall portions 1102, 1104, 1106 and 1108.

Elongate force responsive beam element 1020 is preferably characterized by an elongate dimension $L_4$ along longitudinal axis 1042. In a preferred embodiment of the present invention, as seen in FIGS. 10A-11D, throughgoing longitudinal bore 1100 extends along the entirety of elongate dimension $L_4$.

In a preferred embodiment of the present invention, as seen particularly in FIGS. 10A-10D, throughgoing longitudinal bore 1100 may fully or partially house one or more elements of force sensor assembly 1000, such as electric cable 1086.

Preferably, elongate force responsive beam element 1020 includes a mounting end 1120, for fixedly mounting force sensor assembly 1000 to a support (not shown). In the embodiment of the present invention shown in FIGS. 10A-11D0, mounting end 1120 includes, preferably formed in bottom and top wall portions 1102 and 1108, a plurality of mounting apertures 1122 to receive mounting fasteners (not shown) for affixing elongate force responsive beam element 1020 to the support. In another embodiment of the present invention, mounting apertures 1122 may be obviated, and elongate force responsive beam element 1020 is fixed to the support without using apertures, for example, by clamping mounting end 1120 of elongate force responsive beam element 1020 to the support.

Elongate force responsive beam element 1020 further includes a loading end 1130, being generally opposite mounting end 1120 along longitudinal axis 1042. In the embodiment of the present invention shown in FIGS. 10A-11D, loading end 1130 includes, preferably formed in bottom and top wall portions 1102 and 1108, a plurality of fastener apertures 1132 to receive at least one platform fastener (not shown) for affixing a loading platform (not shown), such as a weighing platform, to elongate force responsive beam element 1020. In another embodiment of the present invention, apertures 1132 may be obviated, and either no loading platform is used with force sensor assembly 1000 or the loading platform is fastened to elongate force responsive beam element 1020 without using apertures, for example, by clamping the loading platform to loading end 1130 of elongate force responsive beam element 1020.

Whether or not a loading platform is used in conjunction with force sensor assembly 1000, force sensor assembly 1000 is typically used by applying an applied force to loading end 1130 of elongate force responsive beam element 1020. Since loading end 1130 is free to deflect in direction 1030 and mounting end 1120 is fixed, an applied force in direction 1030 exerted upon loading end 1130 causes a deformation of elongate force responsive beam element 1020. Particularly, the deformation of elongate force responsive beam element 1020 is typically characterized by an increase in a magnitude of elongate dimension $L_4$. As used herein, an undeformed state of elongate force responsive beam element 1020 refers to a configuration of elongate force responsive beam element 1020 when force sensor assembly 1000 is not subject to an applied force other than those forces which always act on force sensor assembly 1000, such as Earth's gravitational force.

Figure 11A:
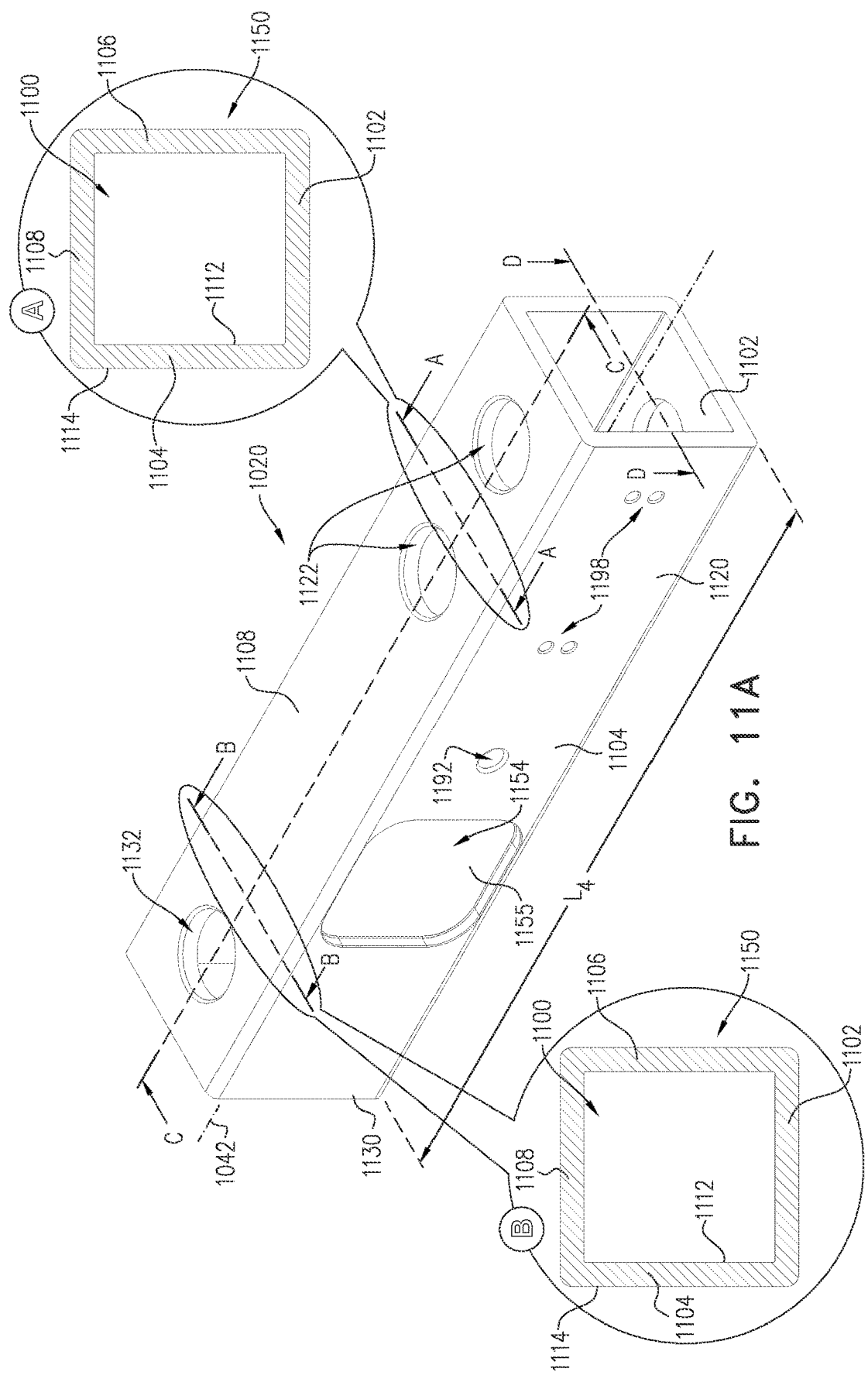
Figure 11B:
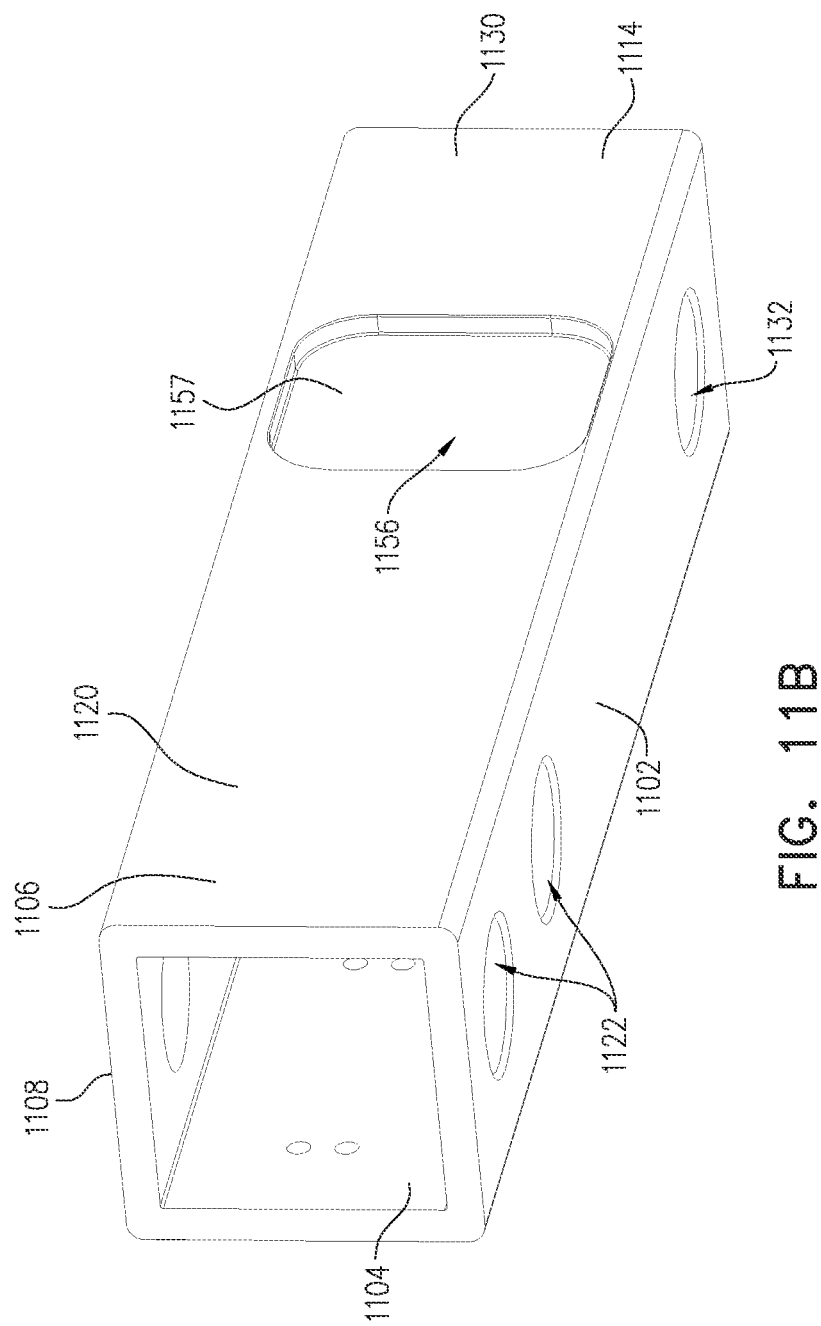

As seen particularly in sectional enlargements A and B of FIG. 11A, which are taken along respective lines A-A and B-B of FIG. 11A, a cross-section 1150 of elongate force responsive beam element 1020 generally perpendicular to longitudinal axis 1042 is hollow. It is appreciated that cross-section 1150 is preferably hollow at both mounting end 1120 and loading end 1130 of elongate force responsive beam element 1020.

In the embodiment shown in FIGS. 10A-11D, cross-section 1150 is generally symmetric, and more particularly is generally square. In another embodiment of the present invention, cross-section 1150 may be any suitable shape, including, inter alia, rectangular, circular, elliptic, triangular, hexagonal, and star-shaped, and the shape of cross-section 1150 may be symmetric or non-symmetric. In one embodiment of the present invention, cross-section 1150 is generally uniform at both mounting end 1120 and loading end 1130 of elongate force responsive beam element 1020. In another embodiment of the present invention, cross-section 1150 is not uniform at both mounting end 1120 and loading end 1130 of elongate force responsive beam element 1020; for example, cross-section 1150 may include additional, preferably threaded, material surrounding one or more of apertures 1122 and 1132.

It is appreciated that a shape and size of cross-section 1150 is determined both by inner surface 1112 and outer surface 1114 of elongate force responsive beam element 1020. In the embodiment illustrated in FIGS. 10A-11D, the shape of inner surface 1112 at cross-section 1150 is the same general shape as the shape of outer surface 1114 at cross-section 1150. In another embodiment of the present invention, the shape of inner surface 1112 at cross-section 1150 is different than the shape of outer surface 1114 at cross-section 1150.

As seen in the embodiment shown in FIGS. 10A-11D, elongate force responsive beam element 1020 is preferably additionally formed with a first recess 1154, including a generally planar wall portion 1155, in first side wall portion 1104 and a second recess 1156, including a generally planar wall portion 1157, in second side wall portion 1106. It is appreciated that in the illustrated embodiment, first and second recesses 1154 and 1156 are formed in outer surface 1114 of elongate force responsive beam element 1020. Alternatively, first and second recesses 1154 and 1156, including respective generally planar wall portions 1155 and 1157, may be formed in inner surface 1112 of elongate force responsive beam element 1020.

In a preferred embodiment of the present invention, at least one of strain gauges 1060 is affixed to wall portion 1155 of first recess 1154 or wall portion 1157 of second recess 1156 in outer surface 1114 of elongate force responsive beam element 1020. More preferably, all of strain gauges 1060 are affixed to wall portion 1155 of first recess 1154 or wall portion 1157 of second recess 1156 in outer surface 1114 of elongate force responsive beam element 1020.

In the alternative embodiment, in which first and second recesses 1154 and 1156 are formed in inner surface 1112 of elongate force responsive beam element 1020, at least one of strain gauges 1060 is affixed to wall portion 1155 of first recess 1154 or wall portion 1157 of second recess 1156 in inner surface 1112 of elongate force responsive beam element 1020. More preferably, all of strain gauges 1060 are affixed to wall portion 1155 of first recess 1154 or wall portion 1157 of second recess 1156 in inner surface 1112 of elongate force responsive beam element 1020.

In a preferred embodiment of the present invention, elongate force responsive beam element 1020 is further formed with an electrical communication aperture 1192, preferably in side wall portion 1104, to allow electrical communication between electric cable 1086 and PCB 1082. Elongate force responsive beam element 1020 is preferably further formed with a plurality of fastener apertures 1198, preferably in side wall portion 1104, which are operative to receive cable fasteners 1088 for the affixation of electric cable 1086 to elongate force responsive beam element 1020.

In one embodiment of the present invention, elongate force responsive beam element 1020 is formed of a metal, such as an aluminum alloy or a steel alloy. In another embodiment of the present invention, elongate force responsive beam element 1020 is formed of a composite material, which may be either a metal matrix composite material or a non-metal matrix composite material, such as, inter alia, a carbon composite or fiberglass.

As described hereinbelow with reference to FIG. 12, elongate force responsive beam element 1020 may be formed by any suitable process, including, inter alia, an extrusion process, a drawing process, a rolling process, a tube forming process, which may be either a seamed tube forming process or a seamless tube forming process, a forging process, a three-dimensional (3D) printing process, a metal injection molding (MIM) process and a machining process.

Similarly, each of recesses 1154 and 1156 and apertures 1122, 1132, 1192 and 1198 may be formed by any suitable process, including, inter alia, machining, electrical discharge machining (EDM), erosion and ablation.

Figure 12:
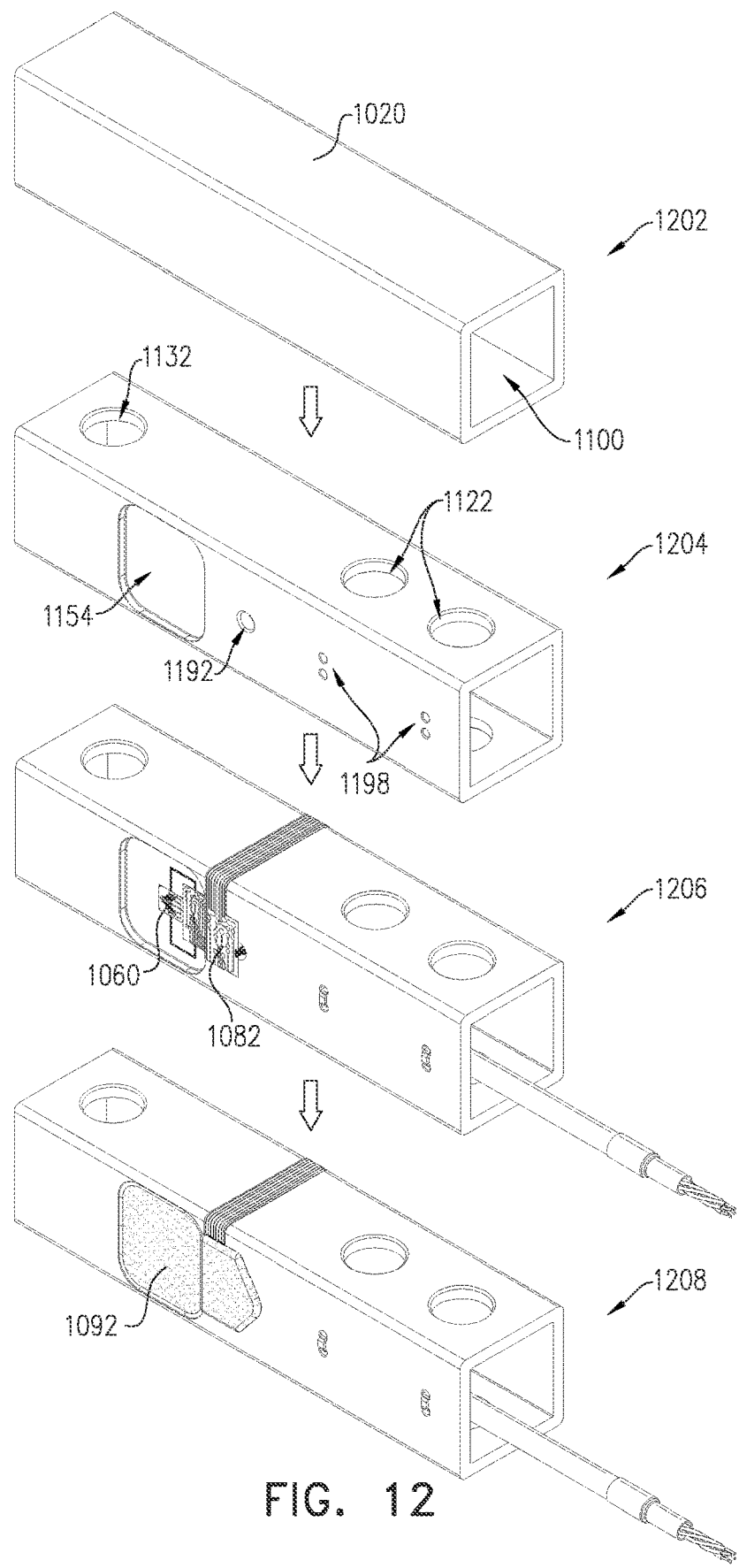
FIG. 12 is a simplified illustration of a method for manufacturing the force sensor assembly of FIGS. 10A-11C.

Reference is now made to FIG. 12, which is a simplified illustration of a method for manufacturing force sensor assembly 1000 of FIGS. 10A-11D. As seen at a fabrication step 1202, the method begins by fabricating elongate force responsive beam element 1020. As described hereinabove with particular reference to FIGS. 10A-11D, elongate force responsive beam element 1020 preferably extends along longitudinal axis 1042, which is generally perpendicular to force application axis 1032, and elongate force responsive beam element 1020 is preferably formed with throughgoing longitudinal bore 1100 along longitudinal axis 1042.

As noted above, fabrication step 1202 may be any suitable process, including, inter alia, an extrusion process, a drawing process, a rolling process, a tube forming process, which may be either a seamed tube forming process or a seamless tube forming process, a forging process, a three-dimensional (3D) printing process, a metal injection molding (MIM) process and a machining process.

In a preferred embodiment of the present invention, bore 1100 is formed together with elongate force responsive beam element 1020. For example, when using an extrusion process for fabrication step 1202, a hollow extrusion profile produced at fabrication step 1202 defines all of wall portions 1102, 1104, 1106 and 1108 as well as bore 1100 of elongate force responsive beam element 1020. Thus, in such an embodiment, preferably no subtractive processes are required to form bore 1100.

In contrast, in embodiments wherein fabrication step 1202 is a subtractive process, bore 1100 is preferably formed after an initial formation step of elongate force responsive beam element 1020. For example, at fabrication step 1202, a solid bar may first be produced, which may then be machined to form bore 1100 therein, thereby producing elongate force responsive beam element 1020.

In one embodiment of the present invention, fabrication step 1202 produces beams each having an elongate dimension which is longer than elongate dimension $L_4$. In such an embodiment, fabrication step 1202 includes cutting each beam into lengths each having an elongate dimension equal to or nearly equal to $L_4$.

As seen at a detailing step 1204, apertures and recesses in elongate force responsive beam element 1020, including apertures 1122 and 1132, recesses 1154 and 1156, including respective generally planar wall portions 1155 and 1157, electrical communication aperture 1192 and fastener apertures 1198, are formed. In an embodiment wherein markings are formed on elongate force responsive beam element 1020, the markings are also preferably formed at detailing step 1204. It is appreciated that the apertures and recesses in elongate force responsive beam element 1020, as well as any markings on elongate force responsive beam element 1020, may be formed by any suitable process, including, inter alia, machining, electrical discharge machining (EDM), erosion and ablation.

As seen at an assembly step 1206, at least one strain gauge 1060 is preferably affixed to elongate force responsive beam element 1020. In a preferred embodiment of the present invention, at least one of strain gauges 1060 is affixed to wall portion 1155 of first recess 1154 or wall portion 1157 of second recess 1156 in outer surface 1114 of elongate force responsive beam element 1020. More preferably, all of strain gauges 1060 are affixed to wall portion 1155 of first recess 1154 or wall portion 1157 of second recess 1156 in outer surface 1114 of elongate force responsive beam element 1020.

As described hereinabove with particular reference to FIGS. 10A-11D, strain gauge or gauges 1060 preferably generate a strain gauge output in response to a force applied in a force application direction 1030. Also at assembly step 1206, strain gauge or gauges 1060 are preferably connected, using ECEs 1070, to circuit elements 1080, which in the embodiment shown in FIGS. 10A-12, are affixed to elongate force responsive beam element 1020, but need not be affixed to elongate force responsive beam element 1020.

As described hereinabove with particular reference to FIGS. 10A-11D, at least some of circuit elements 1080 preferably convert the strain gauge output of strain gauge or gauges 1060 into a force indication, indicating a magnitude of the applied force. As described hereinabove with particular reference to FIGS. 10A-11D, strain gauge or gauges 1060 and circuit elements 1080 are preferably fixedly mounted to elongate force responsive beam element 1020 using any suitable mounting material, most typically an adhesive, such as, inter alia, cyanoacrylate, acrylic or epoxy, or using protective cover elements 1092. It is appreciated that the mounting material used to affix circuit elements 1080 to elongate force responsive beam element 1020 may be the same mounting material used to affix strain gauge or gauges 1060 to elongate force responsive beam element 1020. Alternatively, the mounting material used to affix circuit elements 1080 to elongate force responsive beam element 1020 may be a different mounting material than that used to affix strain gauge or gauges 1060 to elongate force responsive beam element 1020. Also at assembly step 1206, electric cable 1086 is preferably electrically connected to circuit elements 1080, and electric cable 1086 is preferably fixedly mounted to elongate force responsive beam element 1020, preferably using cable fasteners 1088.

As seen in a sealing step 1208, protective cover elements 1092 are preferably affixed to elongate force responsive beam element 1020. It is appreciated that in an embodiment in which protective cover elements 1092 affix at least one of strain gauges 1060 and circuit elements 1080 to elongate force responsive beam element 1020, assembly step 1206 and sealing step 1208 are typically combined into a single step.

In another embodiment of the present invention, force sensor assembly 1000 is hermetically sealed at sealing step 1208, and protective cover elements 1092 may be obviated. Alternatively, sealing step 1208 hermetically seals force sensor assembly 1000 following attachment of protective cover elements 1092.

Figure 13:
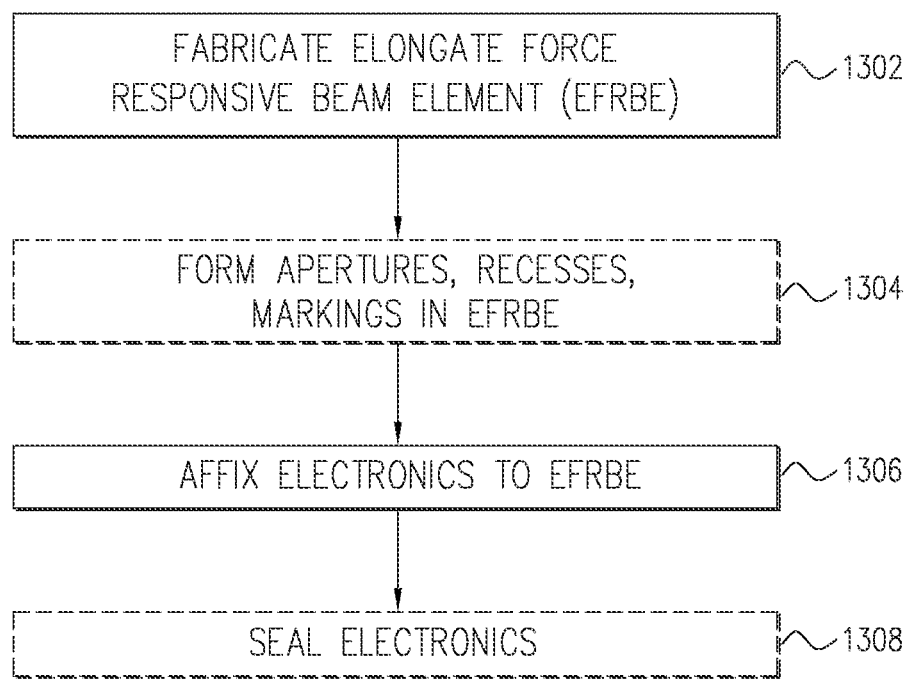
FIG. 13 is a simplified flowchart of a method for manufacturing a force sensor assembly similar to the force sensor assemblies of FIGS. 1A-12.

Reference is now made to FIG. 13, which is a is a simplified flowchart of a method for manufacturing a force sensor assembly, such as, inter alia, any of force sensor assemblies 100, 400, 700 and 1000 of FIGS. 1A-12.

As seen in FIG. 13, the method begins at a fabrication step 1302, by fabricating an elongate force responsive beam element (EFRBE), such as elongate force responsive beam element 120, 420, 720 or 1020. As described hereinabove with reference to FIGS. 1A-12, the EFRBE preferably extends along a longitudinal axis, which is generally perpendicular to a force application direction, and the EFRBE is preferably formed with a throughgoing longitudinal bore, such as bore 200, 500, 800 or 1100, along the longitudinal axis.

As noted above, fabrication step 1302 may be any suitable process, including, inter alia, an extrusion process, a drawing process, a rolling process, a tube forming process, which may be either a seamed tube forming process or a seamless tube forming process, a forging process, a three-dimensional (3D) printing process, a metal injection molding (MIM) process and a machining process.

In a preferred embodiment of the present invention, the throughgoing longitudinal bore is formed together with the EFRBE at fabrication step 1302. For example, when using an extrusion process for fabrication step 1302, a hollow extrusion profile produced at fabrication step 1302 preferably defines both the bore of the EFRBE and all wall portions of the EFRBE which surround the bore. Thus, in such an embodiment, preferably no subtractive processes are required to form the bore of the EFRBE.

In contrast, in embodiments wherein fabrication step 1302 is a subtractive process, the bore going through the EFRBE is preferably formed after an initial formation step of the EFRBE. For example, at fabrication step 1302, a solid bar may first be produced, and the bar may then be machined to form the throughgoing longitudinal bore therein, thereby producing the EFRBE.

In one embodiment of the present invention, fabrication step 1302 produces beams each having an elongate dimension which is longer than a desired elongate dimension of the EFRBE. In such an embodiment, fabrication step 1302 includes cutting each beam into lengths each having an elongate dimension which is the desired elongate dimension of the EFRBE.

As seen at a detailing step 1304, a plurality of apertures and recesses are preferably formed in the EFRBE formed at fabrication step 1302. Such apertures and recesses may be operative to enable components to be fastened to the force sensor assembly being fabricated and/or allow electrical communication between various elements of the force sensor assembly being fabricated.

Additionally, a strain engine, typically a transverse bore, such as transverse bore 260, transverse bore 560 or transverse bore 860, or one or more recesses, such as recesses 1154 and 1156, may be formed at detailing step 1304. The strain engine is preferably embodied as either a transverse bore extending along a transverse axis of the EFRBE, or as at least one recess formed in at least one wall portion of the EFRBE, the recess extending into the at least one wall portion along a transverse axis of the EFRBE. The strain engine preferably has a geometry that provides a plurality of strain positions on the EFRBE. When a force is applied in a loading direction to a loading end of the EFRBE, each of the strain positions preferably experiences a strain generally equal in magnitude to a magnitude of the strains experienced by each of the other strain positions. The loading direction is preferably perpendicular to both the longitudinal axis of the EFRBE and the transverse axis of the EFRBE.

In a preferred embodiment of the present invention, the strain engine formed at detailing step 1304 is a binocular strain engine, and together with the EFRBE, defines an upper beam and a lower beam. Thus, the force sensor assembly manufactured by the method of the flowchart of FIG. 13 is preferably a multi-beam force sensor, and in a preferred embodiment of the present invention, is a single-point force sensor, such as a single-point load cell.

In an embodiment wherein markings are formed on the EFRBE, the markings are also preferably formed at detailing step 1304. It is appreciated that any of the apertures, recesses and markings formed at detailing step 1304 may be formed by any suitable process, including, inter alia, machining, electrical discharge machining (EDM), erosion and ablation.

It is appreciated, as indicated by dashed lines in FIGS. 13, that detailing step 1304 is optional. If no details, such as apertures, recesses or markings, are to be added to the EFRBE fabricated at fabrication step 1302, then the method proceeds directly from fabrication step 1302 to an assembly step 1306. In one embodiment, detailing step 1304 may be combined with fabrication step 1302. For example, in an embodiment wherein the EFRBE is formed by a 3D printing process, the EFRBE is formed together with some, and more preferably all, of the details thereof, such as apertures, recesses and/or markings.

As seen in FIG. 13, at assembly step 1306, electronics are preferably affixed to the EFRBE. The electronics preferably include at least one strain gauge, and more preferably, a plurality of strain gauges, such as, inter alia, 2 strain gauges, 3 strain gauges, 4 strain gauges, 5 strain gauges, 6 strain gauges, 7 strain gauges or 8 strain gauges. Depending on the number of strain gauges included in the force sensor assembly, the strain gauges may be electrically connected to one another in, inter alia, a quarter-bridge configuration, a half-bridge configuration, a full bridge configuration, such as a Wheatstone bridge configuration, or a double-bridge configuration. As described hereinabove, the strain gauge or gauges affixed to the EFRBE at assembly step 1306 preferably generate a strain gauge output, typically an electrical resistance, in response to a force applied in the force application direction.

Also at assembly step 1306, the strain gauge or gauges are preferably connected to a plurality of circuit elements. The circuit elements may be embodied as a flexible printed circuit board, but need not be. In a preferred embodiment of the present invention, the circuit elements are affixed to the EFRBE. In another embodiment of the present invention, the circuit elements are not affixed to the EFRBE. As described hereinabove, at least some of the circuit elements are preferably operative to convert the strain gauge output of the strain gauge or gauges into a force indication, indicating a magnitude of the applied force.

The strain gauge or gauges and the circuit elements are preferably fixedly mounted to the EFRBE using any suitable mounting material, most typically an adhesive, such as, inter alia, cyanoacrylate or epoxy, or using protective cover elements. It is appreciated that the mounting material used to affix the circuit elements to the EFRBE may be the same mounting material used to affix the strain gauge or gauges to the EFRBE. Alternatively, the mounting material used to affix the circuit elements to the EFRBE may be a different mounting material than that used to affix the strain gauge or gauges to the EFRBE.

Also at assembly step 1306, an electric cable is preferably electrically connected to the circuit elements, and the electric cable is preferably fixedly mounted to the EFRBE, preferably using a plurality of cable fasteners. The electric cable preferably electrically connects the circuit elements forming part of the force sensor assembly manufactured using method FIG. 13 to external circuitry, including a power source.

As seen in FIG. 13, the method continues with a sealing step 1308, in which one or more protective cover elements are preferably affixed to the EFRBE. It is appreciated that in an embodiment in which the protective cover elements are used to affix at least one of the strain gauges and circuit elements to the EFRBE, assembly step 1306 and sealing step 1308 are typically combined into a single step.

In another embodiment of the present invention, the force sensor assembly is hermetically sealed at sealing step 1308, and the protective cover elements may be obviated. Alternatively, sealing step 1308 hermetically seals the force sensor assembly following the attachment of protective cover elements.

It is additionally appreciated, as indicated by dashed lines in FIG. 13, that sealing step 1308 is optional. If the force sensor assembly is not to be sealed, then the method terminates following assembly step 1306.

It will be appreciated by persons skilled in the art that the present invention is not limited to what has been particularly shown and described hereinabove. The scope of the present invention includes both combinations and subcombinations of various features described hereinabove as well as modifications thereof, all of which are not in the prior art.

The invention claimed is:

1. An elongate force sensor assembly for measuring a force applied in a force application direction, the force sensor assembly comprising:
   an extruded elongate force responsive beam element extending along a longitudinal axis which is generally perpendicular to said force application direction, said elongate force responsive beam element having a hollow and generally rectangular cross-section generally perpendicular to said longitudinal axis and being formed with:
      a throughgoing longitudinal bore along said longitudinal axis, said throughgoing longitudinal bore being formed together with said elongate force responsive beam element; and
      a strain engine extending along a transverse axis, generally perpendicular to both said force application direction and to said longitudinal axis;
   at least one strain gauge affixed to said elongate force responsive beam element, each of said at least one gauge generating a strain gauge output in response to said force; and
   a plurality of circuit elements operative to convert said strain gauge output into a force indication, indicating a magnitude of said force.

2. An elongate force sensor assembly according to claim 1 and wherein:
   said strain engine comprises a throughgoing transverse bore; and
   said at least one strain gauge and said throughgoing transverse bore at least partially overlie one another.

3. An elongate force sensor assembly according to claim 2 and wherein said elongate force responsive beam element is formed by a rolling process.

4. An elongate force sensor assembly according to claim 2 and wherein said throughgoing longitudinal bore houses at least one of said at least one strain gauge.

5. An elongate force sensor assembly according to claim 2 and wherein said throughgoing longitudinal bore houses an electric cable, said electric cable being electrically connected to said plurality of circuit elements.

6. An elongate force sensor assembly according to claim 1 and wherein:
   said strain engine comprises at least one transverse recess, including a generally planar wall portion, in said elongate force responsive beam element; and
   said at least one strain gauge is affixed to said generally planar wall portion.

7. An elongate force sensor assembly according to claim 6 and wherein said elongate force responsive beam element is formed by a rolling process.

* * * * *